US012566589B2

(12) United States Patent
Solomon et al.

(10) Patent No.: US 12,566,589 B2
(45) Date of Patent: Mar. 3, 2026

(54) SYSTEM AND METHOD FOR DETERMINING DATA FEED SOURCES FOR INTERACTIVE AUTOMATED CODE GENERATION AND MODIFICATION

(71) Applicant: BANK OF AMERICA CORPORATION, Charlotte, NC (US)

(72) Inventors: Suresh Solomon, Marlboro, NJ (US); Ganesh Agrawal, Plainsboro, NJ (US); Vikash Agarwal, Plainsboro, NJ (US); Mark Labbancz, Robbinsville, NJ (US); Deepak Chandrasheker Kundapur, Morganville, NJ (US); Rahul Tandon, Monroe Township, NJ (US); Rajneesh Acharya, Princeton Junction, NJ (US); Dharanitharan Sukumar, Edison, NJ (US); Manoj Narayanan, Edison, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 105 days.

(21) Appl. No.: 18/244,828

(22) Filed: Sep. 11, 2023

(65) Prior Publication Data

US 2025/0085930 A1    Mar. 13, 2025

(51) Int. Cl.
*G06F 16/00* (2019.01)
*G06F 8/33* (2018.01)
*G06F 8/34* (2018.01)
(52) U.S. Cl.
CPC . *G06F 8/33* (2013.01); *G06F 8/34* (2013.01)
(58) Field of Classification Search
CPC .................................. G06F 8/33; G06F 8/34
See application file for complete search history.

(56) References Cited

U.S. PATENT DOCUMENTS

| 5,337,405 A | 8/1994 | Lindauer |
| 6,216,131 B1 | 4/2001 | Liu |
| (Continued) | | |

FOREIGN PATENT DOCUMENTS

| CA | 2940760 C | 5/2019 |
| CN | 103593199 A | 2/2014 |
| WO | 2022003737 A1 | 1/2022 |

OTHER PUBLICATIONS

Hawick, Kenneth A., Heath A. James, and Paul D. Coddington. "A reconfigurable component-based problem solving environment." Proceedings of the 34th Annual Hawaii International Conference on System Sciences. IEEE, 2001. (Year: 2001).

(Continued)

*Primary Examiner* — Syed H Hasan
(74) *Attorney, Agent, or Firm* — Moore & Van Allen PLLC; Nicholas C. Russell

(57) ABSTRACT

Systems, computer program products, and methods for determining data feed sources for interactive automated code generation and modification are provided. The method includes causing a connection with one or more data feeds. Each of the one or more data feeds are capable of providing at least one data set. The method further includes causing a transmission of a recommendation of at least one data feed. The method still further includes causing a rendering of each of the data feed(s) to an end-point device. The method also includes receiving an indication of selected data feed(s). The selected data feed(s) provide data set(s) for the flow execution. The method further includes determining an additional selected data feed from a new data feed input from the end-point device. The method also includes causing an execution of the flow with each of the selected data feeds and the additional selected data feed included.

20 Claims, 29 Drawing Sheets

(56) References Cited

U.S. PATENT DOCUMENTS

| | | |
|---|---|---|
| 6,851,087 B1 | 2/2005 | Sibert |
| 7,975,019 B1 | 7/2011 | Green |
| 10,242,258 B2 | 3/2019 | Guo |
| 10,347,027 B2 | 7/2019 | Stewart |
| 10,735,536 B2 | 8/2020 | Nano |
| 10,740,492 B2 | 8/2020 | David |
| 10,885,021 B1 | 1/2021 | Llorca et al. |
| 10,983,670 B2 | 4/2021 | Vyaghrapuri et al. |
| 11,029,662 B2 | 6/2021 | Dyakin et al. |
| 11,093,490 B2 | 8/2021 | Bice |
| 11,379,506 B2 | 7/2022 | Stojanovic |
| 11,397,726 B2 | 7/2022 | Beedgen |
| 11,429,264 B1 | 8/2022 | Weir et al. |
| 11,531,906 B2 | 12/2022 | Roberts |
| 2005/0071140 A1 | 3/2005 | Ben-Hur |
| 2005/0278307 A1 | 12/2005 | Battagin |
| 2006/0117265 A1 | 6/2006 | Omi et al. |
| 2006/0184597 A1 | 8/2006 | Yamashita et al. |
| 2008/0281820 A1 | 11/2008 | Do |
| 2009/0006460 A1 | 1/2009 | Kleinberg |
| 2009/0254912 A1 | 10/2009 | Roundtree |
| 2011/0106791 A1 | 5/2011 | Maim |
| 2012/0101975 A1 | 4/2012 | Khosravy |
| 2014/0108357 A1 | 4/2014 | Procops et al. |
| 2014/0365939 A1 | 12/2014 | Glaeske et al. |
| 2016/0232457 A1 | 8/2016 | Gray et al. |
| 2016/0357526 A1* | 12/2016 | Soffer .................. G06F 8/36 |
| 2017/0286526 A1 | 10/2017 | Bar-Or et al. |
| 2017/0310552 A1 | 10/2017 | Wallerstein |
| 2017/0371926 A1 | 12/2017 | Shiran et al. |
| 2018/0039399 A1 | 2/2018 | Kaltegaertner et al. |
| 2018/0218046 A1 | 8/2018 | Woo |
| 2020/0302008 A1 | 9/2020 | Hogan et al. |
| 2021/0109894 A1 | 4/2021 | Ramesh et al. |
| 2021/0385251 A1 | 12/2021 | Crabtree et al. |
| 2022/0245176 A1 | 8/2022 | Weisman |
| 2022/0327113 A1 | 10/2022 | Beedgen |
| 2022/0377845 A1* | 11/2022 | Baset .................. H04W 88/085 |
| 2023/0004528 A1 | 1/2023 | Thangaraj et al. |
| 2023/0169126 A1* | 6/2023 | Poston ............... H04L 67/1004 707/737 |
| 2024/0078093 A1 | 3/2024 | Ferrandiz et al. |
| 2024/0143344 A1 | 5/2024 | Campos et al. |
| 2024/0403289 A1 | 12/2024 | Hawes et al. |
| 2024/0427558 A1 | 12/2024 | Hood |

OTHER PUBLICATIONS

Killeen, Neil EB, et al. "Integration of modern data management practice with scientific workflows." 2012 IEEE 8th International Conference on E-Science. IEEE, 2012. (Year: 2012).

Nolte, Hendrik, et al. "Instant clue: a software suite for interactive data visualization and analysis." Scientific reports 8.1 (2018): 12648. (Year: 2018).

Danenas, Paulius, Tomas Skersys, and Rimantas Butleris. "Extending drag-and-drop actions-based model-to-model transformations with natural language processing." Applied Sciences 10.19 (2020): 6835. (Year: 2020).

Perez-Garcia, Fernando, Rachel Sparks, and Sebastien Ourselin. "TorchIO: a Python library for efficient loading, preprocessing, augmentation and patch-based sampling of medical images in deep learning." Computer methods and programs in biomedicine 208 (2021): 106236. (Year: 2021).

Lopez-Fernandez, Hugo, et al. "SEDA: a desktop tool suite for FASTA files processing." IEEE/ACM Transactions on Computational Biology and Bioinformatics 19.3 (2020): 1850-1860. (Year: 2020).

\* cited by examiner

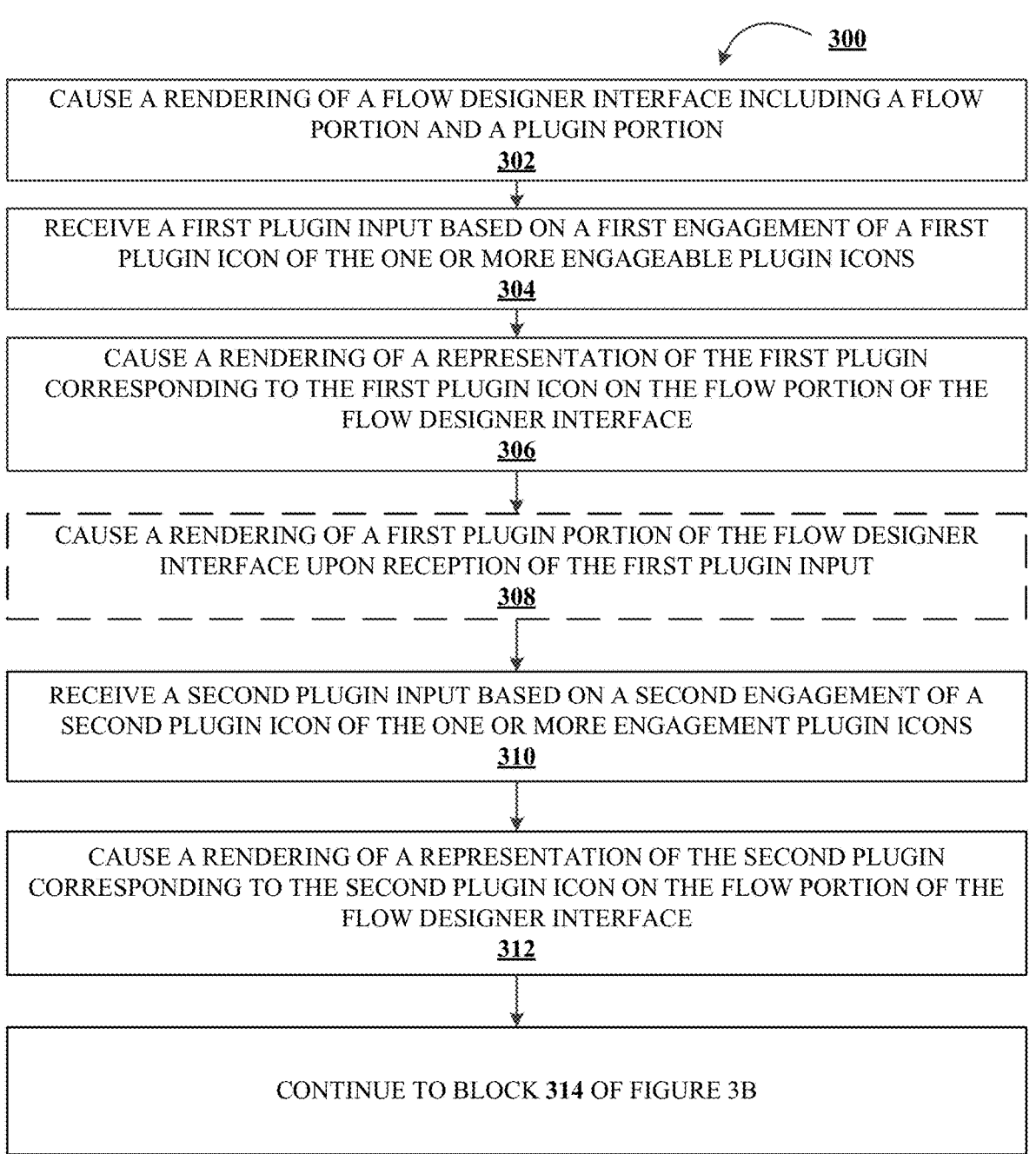

300

CAUSE A RENDERING OF A FLOW DESIGNER INTERFACE INCLUDING A FLOW PORTION AND A PLUGIN PORTION
302

RECEIVE A FIRST PLUGIN INPUT BASED ON A FIRST ENGAGEMENT OF A FIRST PLUGIN ICON OF THE ONE OR MORE ENGAGEABLE PLUGIN ICONS
304

CAUSE A RENDERING OF A REPRESENTATION OF THE FIRST PLUGIN CORRESPONDING TO THE FIRST PLUGIN ICON ON THE FLOW PORTION OF THE FLOW DESIGNER INTERFACE
306

CAUSE A RENDERING OF A FIRST PLUGIN PORTION OF THE FLOW DESIGNER INTERFACE UPON RECEPTION OF THE FIRST PLUGIN INPUT
308

RECEIVE A SECOND PLUGIN INPUT BASED ON A SECOND ENGAGEMENT OF A SECOND PLUGIN ICON OF THE ONE OR MORE ENGAGEMENT PLUGIN ICONS
310

CAUSE A RENDERING OF A REPRESENTATION OF THE SECOND PLUGIN CORRESPONDING TO THE SECOND PLUGIN ICON ON THE FLOW PORTION OF THE FLOW DESIGNER INTERFACE
312

CONTINUE TO BLOCK 314 OF FIGURE 3B

FIGURE 3A

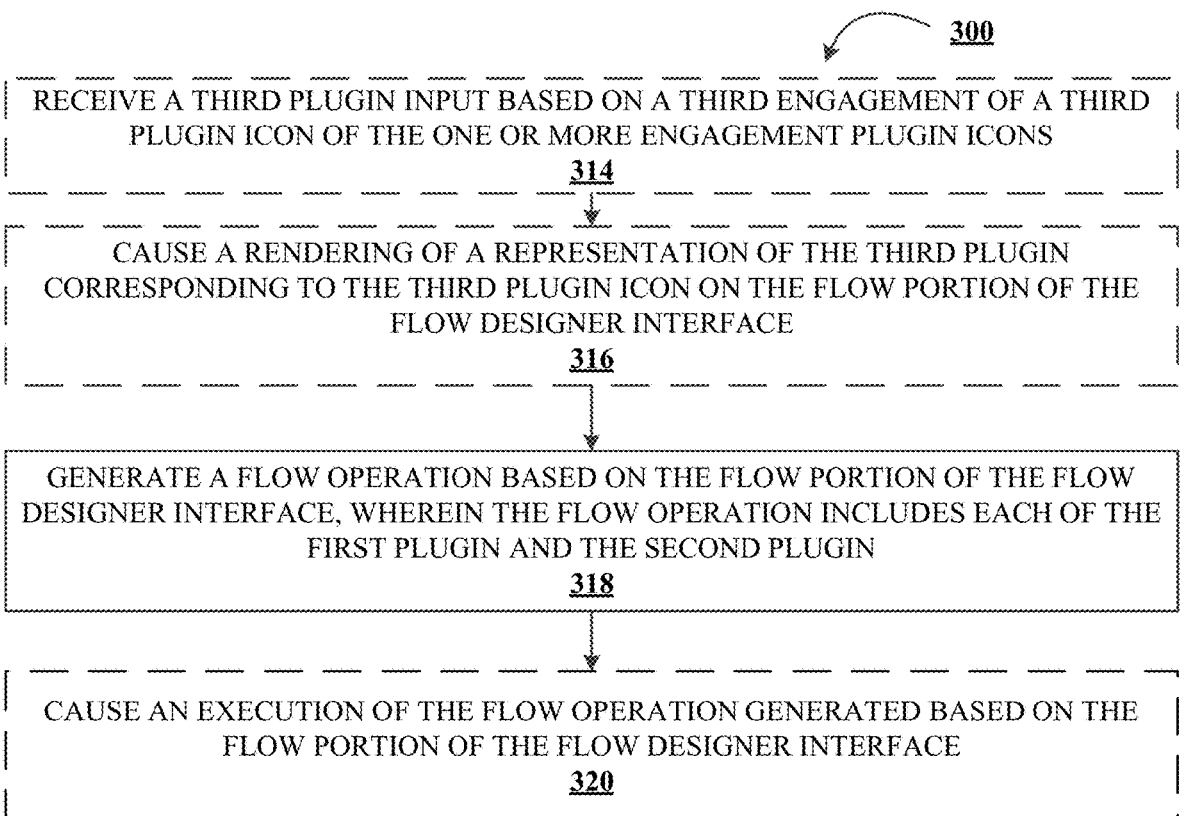

RECEIVE A THIRD PLUGIN INPUT BASED ON A THIRD ENGAGEMENT OF A THIRD PLUGIN ICON OF THE ONE OR MORE ENGAGEMENT PLUGIN ICONS
314

CAUSE A RENDERING OF A REPRESENTATION OF THE THIRD PLUGIN CORRESPONDING TO THE THIRD PLUGIN ICON ON THE FLOW PORTION OF THE FLOW DESIGNER INTERFACE
316

GENERATE A FLOW OPERATION BASED ON THE FLOW PORTION OF THE FLOW DESIGNER INTERFACE, WHEREIN THE FLOW OPERATION INCLUDES EACH OF THE FIRST PLUGIN AND THE SECOND PLUGIN
318

CAUSE AN EXECUTION OF THE FLOW OPERATION GENERATED BASED ON THE FLOW PORTION OF THE FLOW DESIGNER INTERFACE
320

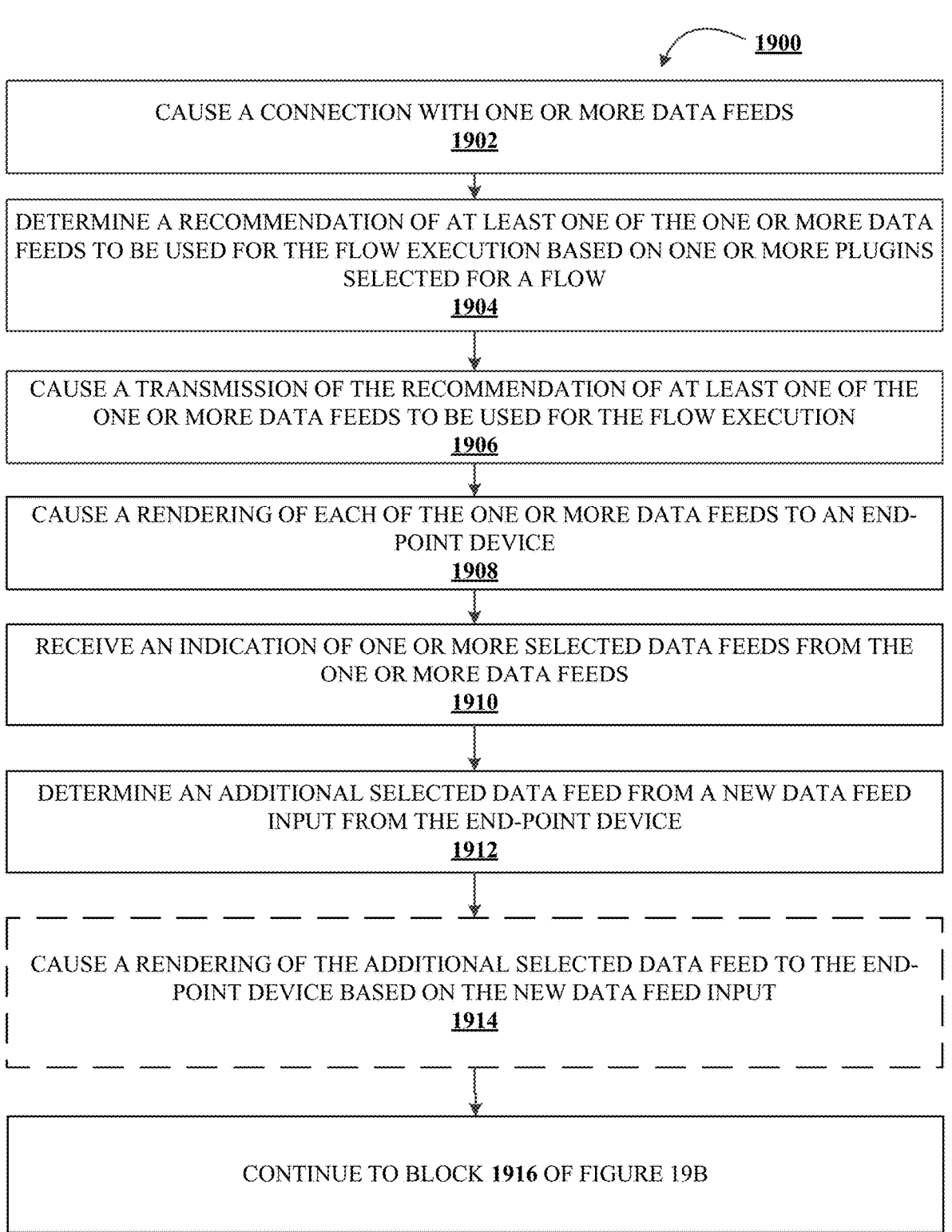

1900

CAUSE A CONNECTION WITH ONE OR MORE DATA FEEDS
1902

DETERMINE A RECOMMENDATION OF AT LEAST ONE OF THE ONE OR MORE DATA FEEDS TO BE USED FOR THE FLOW EXECUTION BASED ON ONE OR MORE PLUGINS SELECTED FOR A FLOW
1904

CAUSE A TRANSMISSION OF THE RECOMMENDATION OF AT LEAST ONE OF THE ONE OR MORE DATA FEEDS TO BE USED FOR THE FLOW EXECUTION
1906

CAUSE A RENDERING OF EACH OF THE ONE OR MORE DATA FEEDS TO AN END-POINT DEVICE
1908

RECEIVE AN INDICATION OF ONE OR MORE SELECTED DATA FEEDS FROM THE ONE OR MORE DATA FEEDS
1910

DETERMINE AN ADDITIONAL SELECTED DATA FEED FROM A NEW DATA FEED INPUT FROM THE END-POINT DEVICE
1912

CAUSE A RENDERING OF THE ADDITIONAL SELECTED DATA FEED TO THE END-POINT DEVICE BASED ON THE NEW DATA FEED INPUT
1914

CONTINUE TO BLOCK 1916 OF FIGURE 19B

FIGURE 19A

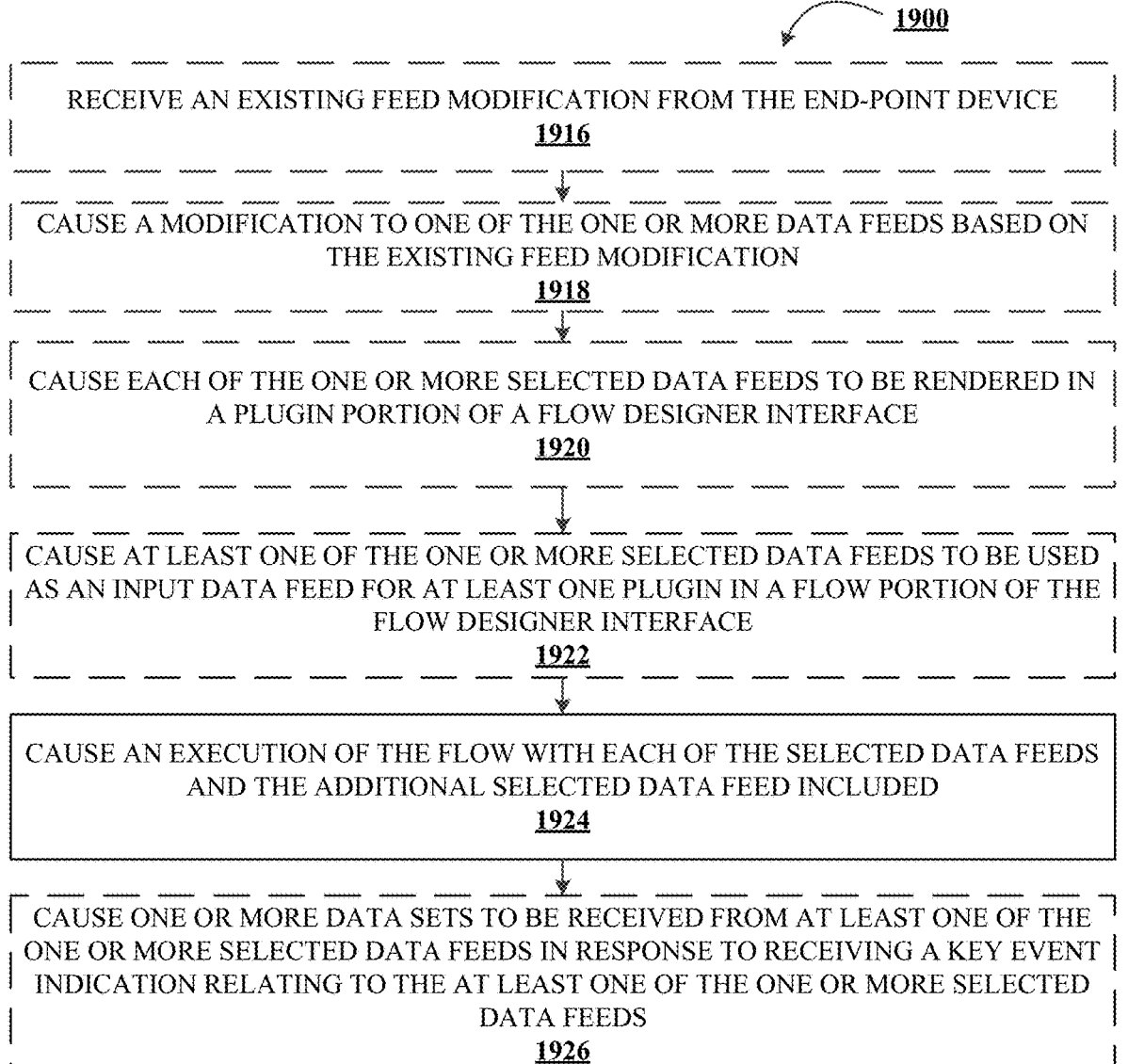

1900

RECEIVE AN EXISTING FEED MODIFICATION FROM THE END-POINT DEVICE
1916

CAUSE A MODIFICATION TO ONE OF THE ONE OR MORE DATA FEEDS BASED ON THE EXISTING FEED MODIFICATION
1918

CAUSE EACH OF THE ONE OR MORE SELECTED DATA FEEDS TO BE RENDERED IN A PLUGIN PORTION OF A FLOW DESIGNER INTERFACE
1920

CAUSE AT LEAST ONE OF THE ONE OR MORE SELECTED DATA FEEDS TO BE USED AS AN INPUT DATA FEED FOR AT LEAST ONE PLUGIN IN A FLOW PORTION OF THE FLOW DESIGNER INTERFACE
1922

CAUSE AN EXECUTION OF THE FLOW WITH EACH OF THE SELECTED DATA FEEDS AND THE ADDITIONAL SELECTED DATA FEED INCLUDED
1924

CAUSE ONE OR MORE DATA SETS TO BE RECEIVED FROM AT LEAST ONE OF THE ONE OR MORE SELECTED DATA FEEDS IN RESPONSE TO RECEIVING A KEY EVENT INDICATION RELATING TO THE AT LEAST ONE OF THE ONE OR MORE SELECTED DATA FEEDS
1926

FIGURE 19B

SYSTEM AND METHOD FOR DETERMINING DATA FEED SOURCES FOR INTERACTIVE AUTOMATED CODE GENERATION AND MODIFICATION

TECHNOLOGICAL FIELD

Example embodiments of the present disclosure relate generally to code generation and modification and, more particularly, to determining data feed sources for interactive automated code generation and modification.

BACKGROUND

Creating process specific to a given task typically requires coding individual applications. As such, developers are typically required to create flow processes for a network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for determining data feed sources for interactive automated code generation and modification is provided. The system includes at least one non-transitory storage device containing instructions and at least one processing device coupled to the at least one non-transitory storage device. The at least one processing device, upon execution of the instructions, is configured to cause a connection with one or more data feeds. Each of the one or more data feeds are capable of providing at least one data set for a flow execution. The at least one processing device, upon execution of the instructions, is also configured to determine a recommendation of at least one of the one or more data feeds to be used for the flow execution based on one or more plugins selected for a flow. The at least one processing device, upon execution of the instructions, is further configured to cause a transmission of the recommendation of at least one of the one or more data feeds to be used for the flow execution. The at least one processing device, upon execution of the instructions, is still further configured to cause a rendering of each of the one or more data feeds to an end-point device. The at least one processing device, upon execution of the instructions, is also configured to receive an indication of one or more selected data feeds from the one or more data feeds. The one or more selected data feeds provide at least one data set for the flow execution. The at least one processing device, upon execution of the instructions, is further configured to determine an additional selected data feed from a new data feed input from the end-point device. The new data feed input indicates additional selected data feed that is different than each of the one or more data feeds. The at least one processing device, upon execution of the instructions, is also configured to cause an execution of the flow with each of the selected data feeds and the additional selected data feed included.

In various embodiments, the at least one processing device, upon execution of the instructions, is configured to cause one or more data sets to be received from at least one of the one or more selected data feeds in response to receiving a key event indication relating to the at least one of the one or more selected data feeds.

In various embodiments, the at least one processing device, upon execution of the instructions, is configured to receive an existing feed modification from the end-point device with the existing feed modification being a change to one of the one or more data feeds and cause a modification to one of the one or more data feeds based on the existing feed modification.

In various embodiments, the at least one processing device, upon execution of the instructions, is configured to cause a rendering of the additional selected data feed to the end-point device based on the new data feed input. In various embodiments, the rendering of each of the one or more data feeds to the end-point device is a list of the one or more data feeds in which each of the data feeds may be selected as one of the one or more selected data feeds.

In various embodiments, the at least one processing device, upon execution of the instructions, is configured to cause each of the one or more selected data feeds to be rendered in a plugin portion of a flow designer interface. In various embodiments, the at least one processing device, upon execution of the instructions, is configured to cause at least one of the one or more selected data feeds to be used as an input data feed for at least one plugin in a flow portion of the flow designer interface.

In another example embodiment, a computer program product for determining data feed sources for interactive automated code generation and modification is provided. The computer program product includes at least one non-transitory computer-readable medium having computer-readable program code portions embodied therein. The computer-readable program code portions include one or more executable portions configured to cause a connection with one or more data feeds. Each of the one or more data feeds are capable of providing at least one data set for a flow execution. The computer-readable program code portions include one or more executable portions also configured to determine a recommendation of at least one of the one or more data feeds to be used for the flow execution based on one or more plugins selected for a flow. The computer-readable program code portions include one or more executable portions further configured to cause a transmission of the recommendation of at least one of the one or more data feeds to be used for the flow execution. The computer-readable program code portions include one or more executable portions still further configured to cause a rendering of each of the one or more data feeds to an end-point device. The computer-readable program code portions include one or more executable portions also configured to receive an indication of one or more selected data feeds from the one or more data feeds. The one or more selected data feeds provide at least one data set for the flow execution. The computer-readable program code portions include one or more executable portions further configured to determine an additional selected data feed from a new data feed input from the end-point device. The new data feed input indicates additional selected data feed that is different than each of the one or more data feeds. The computer-readable program code portions include one or more executable portions further configured to cause an execution of the flow with each of the selected data feeds and the additional selected data feed included.

In various embodiments, the computer-readable program code portions including one or more executable portions are also configured to cause one or more data sets to be received from at least one of the one or more selected data feeds in response to receiving a key event indication relating to the at least one of the one or more selected data feeds.

In various embodiments, the computer-readable program code portions including one or more executable portions are also configured to receive an existing feed modification from the end-point device with the existing feed modification being a change to one of the one or more data feeds and cause a modification to one of the one or more data feeds based on the existing feed modification.

In various embodiments, the computer-readable program code portions including one or more executable portions are also configured to cause a rendering of the additional selected data feed to the end-point device based on new data feed input.

In various embodiments, the rendering of each of the one or more data feeds to the end-point device is a list of the one or more data feeds in which each of the data feeds may be selected as one of the one or more selected data feeds.

In various embodiments, the computer-readable program code portions including one or more executable portions are also configured to cause each of the one or more selected data feeds to be rendered in a plugin portion of a flow designer interface. In various embodiments, the computer-readable program code portions including one or more executable portions are also configured to cause at least one of the one or more selected data feeds to be used as an input data feed for at least one plugin in a flow portion of the flow designer interface.

In still another example embodiment, a method for determining data feed sources for interactive automated code generation and modification is provided. The method includes causing a connection with one or more data feeds. Each of the one or more data feeds are capable of providing at least one data set for a flow execution. The method also includes determining a recommendation of at least one of the one or more data feeds to be used for the flow execution based on one or more plugins selected for a flow. The method further includes causing a transmission of the recommendation of at least one of the one or more data feeds to be used for the flow execution. The method still further includes causing a rendering of each of the one or more data feeds to an end-point device. The method also includes receiving an indication of one or more selected data feeds from the one or more data feeds. The one or more selected data feeds provide at least one data set for the flow execution. The method further includes determining an additional selected data feed from a new data feed input from the end-point device. The new data feed input indicates additional selected data feed that is different than each of the one or more data feeds. The method still further includes causing an execution of the flow with each of the selected data feeds and the additional selected data feed included.

In various embodiments, the method also includes causing one or more data sets to be received from at least one of the one or more selected data feeds in response to receiving a key event indication relating to the at least one of the one or more selected data feeds.

In various embodiments, the method also includes receiving an existing feed modification from the end-point device with the existing feed modification being a change to one of the one or more data feeds and causing a modification to one of the one or more data feeds based on the existing feed modification.

In various embodiments, the rendering of each of the one or more data feeds to the end-point device is a list of the one or more data feeds in which each of the data feeds may be selected as one of the one or more selected data feeds.

In various embodiments, the method also includes causing a rendering of the additional selected data feed to the end-point device based on new data feed input.

In various embodiments, the method also includes causing each of the one or more selected data feeds to be rendered in a plugin portion of a flow designer interface. In various embodiments, the method also includes causing at least one of the one or more selected data feeds to be used as an input data feed for at least one plugin in a flow portion of the flow designer interface.

In an example embodiment, a system for interactive automated code generation and modification for data processing is provided. The system includes at least one non-transitory storage device containing instructions and at least one processing device coupled to the at least one non-transitory storage device. The at least one processing device, upon execution of the instructions, is configured to cause a rendering of a flow designer interface including a flow portion and a plugin portion. The plugin portion includes one or more engageable plugin icons. Each of the one or more engageable plugin icons corresponds to one of one or more plugins. The at least one processing device, upon execution of the instructions, is configured to receive a first plugin input based on a first engagement of a first plugin icon of the one or more engageable plugin icons. The first plugin input is a selection of a first plugin to be included in the flow portion of the flow designer interface. The at least one processing device, upon execution of the instructions, is configured to cause a rendering of a representation of the first plugin corresponding to the first plugin icon on the flow portion of the flow designer interface. The at least one processing device, upon execution of the instructions, is configured to receive a second plugin input based on a second engagement of a second plugin icon of the one or more engagement plugin icons. The second plugin input is a selection of a second plugin to be included in the flow portion of the flow designer interface. The second plugin input includes a connection indication between the first plugin and the second plugin. The at least one processing device, upon execution of the instructions, is configured to cause a rendering of a representation of the second plugin corresponding to the second plugin icon on the flow portion of the flow designer interface. The representation of the first plugin and the representation of the second plugin on the flow portion are connected based on the second plugin input. The at least one processing device, upon execution of the instructions, is configured to generate a flow operation based on the flow portion of the flow designer interface. The flow operation includes each of the first plugin and the second plugin.

In various embodiments, the at least one processing device, upon execution of the instructions, is configured to cause a rendering of a selected plugin portion of the flow designer interface upon reception of the first plugin input with the selected plugin portion including one or more customizable fields relating to the first plugin.

In various embodiments, the first plugin icon and the second plugin icon are different plugin icons of the one or more engageable plugin icons. In various embodiments, the first plugin icon and the second plugin icon are a same plugin icon of the one or more engageable plugin icons. In
various embodiments, at least one of the first plugin or the
second plugin define an input data feed.

In various embodiments, the at least one processing
device, upon execution of the instructions, is configured to
receive a third plugin input based on a third engagement of
a third plugin icon of the one or more engagement plugin
icons with the third plugin input being a selection of a third
plugin to be included in the flow portion of the flow designer
interface, and the third plugin input including a connection
indication between the third plugin and at least one of the
first plugin or the second plugin; and cause a rendering of a
representation of the third plugin corresponding to the third
plugin icon on the flow portion of the flow designer interface
with the representation of the third plugin being connected
to at least one of the representation of the first plugin or the
representation of the second plugin based on the third plugin
input.

In various embodiments, the at least one processing
device, upon execution of the instructions, is configured to
cause an execution of the flow operation generated based on
the flow portion of the flow designer interface.

In another example embodiment, a computer program
product for interactive automated code generation and modi-
fication for data processing is provided. The computer
program product includes at least one non-transitory com-
puter-readable medium having computer-readable program
code portions embodied therein. The computer-readable
program code portions including one or more executable
portions configured to cause a rendering of a flow designer
interface comprising a flow portion and a plugin portion.
The plugin portion includes one or more engageable plugin
icons. Each of the one or more engageable plugin icons
corresponds to one of one or more plugins. The computer-
readable program code portions including one or more
executable portions also configured to receive a first plugin
input based on a first engagement of a first plugin icon of the
one or more engageable plugin icons. The first plugin input
is a selection of a first plugin to be included in the flow
portion of the flow designer interface. The computer-readable program code portions including one or more execut-
able portions further configured to cause a rendering of a
representation of the first plugin corresponding to the first
plugin icon on the flow portion of the flow designer inter-
face. The computer-readable program code portions including one or more executable portions still further configured
to receive a second plugin input based on a second engage-
ment of a second plugin icon of the one or more engagement
plugin icons. The second plugin input is a selection of a
second plugin to be included in the flow portion of the flow
designer interface. The second plugin input includes a
connection indication between the first plugin and the sec-
ond plugin. The computer-readable program code portions
including one or more executable portions also configured to
cause a rendering of a representation of the second plugin
corresponding to the second plugin icon on the flow portion
of the flow designer interface. The representation of the first
plugin and the representation of the second plugin on the
flow portion are connected based on the second plugin input.
The computer-readable program code portions including one
or more executable portions also configured to generate a
flow operation based on the flow portion of the flow designer
interface. The flow operation includes each of the first plugin
and the second plugin.

In various embodiments, the computer-readable program
code portions including one or more executable portions are
also configured to cause a rendering of a selected plugin portion of the flow designer interface upon reception of the
first plugin input with the selected plugin portion including
one or more customizable fields relating to the first plugin.

In various embodiments, the first plugin icon and the
second plugin icon are different plugin icons of the one or
more engageable plugin icons. In various embodiments, the
first plugin icon and the second plugin icon are a same
plugin icon of the one or more engageable plugin icons. In
various embodiments, at least one of the first plugin or the
second plugin define an input data feed.

In various embodiments, the computer-readable program
code portions including one or more executable portions are
also configured to receive a third plugin input based on a
third engagement of a third plugin icon of the one or more
engagement plugin icons with the third plugin input being a
selection of a third plugin to be included in the flow portion
of the flow designer interface, and the third plugin input
including a connection indication between the third plugin
and at least one of the first plugin or the second plugin; and
cause a rendering of a representation of the third plugin
corresponding to the third plugin icon on the flow portion of
the flow designer interface with the representation of the
third plugin being connected to at least one of the represen-
tation of the first plugin or the representation of the second
plugin based on the third plugin input.

In various embodiments, the computer-readable program
code portions including one or more executable portions are
also configured to cause an execution of the flow operation
generated based on the flow portion of the flow designer
interface.

In still another example embodiment, a method for inter-
active automated code generation and modification for data
processing is provided. The method includes causing a
rendering of a flow designer interface comprising a flow
portion and a plugin portion. The plugin portion includes
one or more engageable plugin icons. Each of the one or
more engageable plugin icons corresponds to one of one or
more plugins. The method also includes receiving a first
plugin input based on a first engagement of a first plugin
icon of the one or more engageable plugin icons. The first
plugin input is a selection of a first plugin to be included in
the flow portion of the flow designer interface. The method
further includes causing a rendering of a representation of
the first plugin corresponding to the first plugin icon on the
flow portion of the flow designer interface. The method still
further includes receiving a second plugin input based on a
second engagement of a second plugin icon of the one or
more engagement plugin icons. The second plugin input is
a selection of a second plugin to be included in the flow
portion of the flow designer interface. The second plugin
input includes a connection indication between the first
plugin and the second plugin. The method also includes
causing a rendering of a representation of the second plugin
corresponding to the second plugin icon on the flow portion
of the flow designer interface. The representation of the first
plugin and the representation of the second plugin on the
flow portion are connected based on the second plugin input.
The method further includes generating a flow operation
based on the flow portion of the flow designer interface. The
flow operation includes each of the first plugin and the
second plugin.

In various embodiments, the method includes causing a
rendering of a selected plugin portion of the flow designer
interface upon reception of the first plugin input with the
selected plugin portion including one or more customizable
fields relating to the first plugin.

In various embodiments, the first plugin icon and the second plugin icon are different plugin icons of the one or more engageable plugin icons, or the first plugin icon and the second plugin icon are a same plugin icon of the one or more engageable plugin icons. In various embodiments, at least one of the first plugin or the second plugin define an input data feed.

In various embodiments, the method includes receiving a third plugin input based on a third engagement of a third plugin icon of the one or more engagement plugin icons with the third plugin input being a selection of a third plugin to be included in the flow portion of the flow designer interface and the third plugin input including a connection indication between the third plugin and at least one of the first plugin or the second plugin; and causing a rendering of a representation of the third plugin corresponding to the third plugin icon on the flow portion of the flow designer interface with the representation of the third plugin being connected to at least one of the representation of the first plugin or the representation of the second plugin based on the third plugin input.

In various embodiments, the method includes causing an execution of the flow operation generated based on the flow portion of the flow designer interface.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIGS. 3A and 3B illustrate a process flow for interactive automated code generation and modification for data processing, in accordance with various embodiments of the present disclosure;

FIG. 4 illustrates an example feed builder that includes information relating to data feed that may be rendered to a flow designer interface, in accordance with various embodiments of the present disclosure;

FIG. 6 illustrates an example data dictionary that includes information relating to definitions for individual values in a data set that may be rendered to a flow designer interface, in accordance with various embodiments of the present disclosure;

FIGS. 19A and 19B illustrate a process flow for determining data feed sources for interactive automated code generation and modification, in accordance with various embodiments of the present disclosure.

DETAILED DESCRIPTION

Figure 1A:
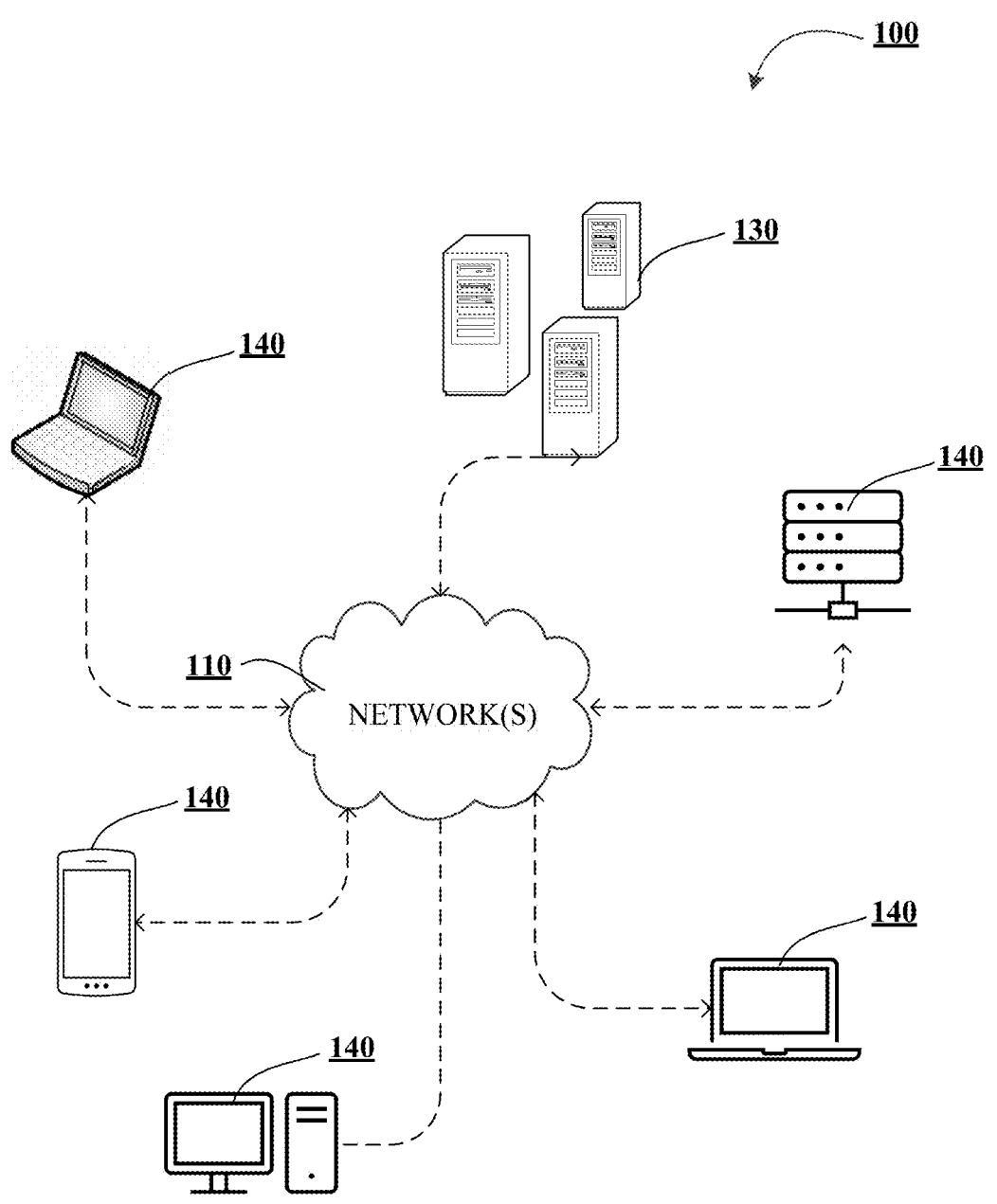
FIGS. 1A-1C illustrate technical components of an exemplary distributed computing environment for interactive automated code generation and modification for data processing, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Automating processing flows typically requires hard coding individual processes. As such, any changes to the processing may cause the other processes in the flow to be changed. However, such operations are time consuming and difficult to achieve. Additionally, non-technical users are not able to build and/or automate processes.

Various embodiments of the present disclosure provide interactive automated code generation and modification for data processing. As such, various embodiments provide a web-based, visual development platform that does not require individual coding of plugins. The modularized platform encompasses data ingestion, data quality checks, flow creation, flow execution scheduling, calculation integration, and/or the like. To do this, the system provides a flow designer interface with a plugin portion and a flow portion of the interface. The plugin portion includes each of the plugins that are available to be added to the flow. Selected plugins are then rendered in the flow portion. Multiple plugins can be represented in the flow portion and connected to one another to create a flow. The operations necessary to execute the flow are generated based on the plugin representations rendered in the flow portion of the flow designer interface. Various embodiments discussed herein allow for the flow designer interface to be customized and/or updated for different use cases.

Determining data feeds to use for a flow can be difficult and time consuming for users. As the complexity of data processing increases, the number of different data sources increases. Additionally, the data sources may update at different times, causing a system to either have to continuously monitor for data changes or potentially be behind real-time (e.g., the data may be out of date).

Various embodiments of the present disclosure are used for determining data feed sources for interactive automated code generation and modification. The system may provide an interface for selecting data sources to be included during data processing. The data sources may each be determined by the system and listed for a user to select the sources to be used during processing. The system may provide recommended data feeds based on the data feeds available. The user can make changes to existing data feeds and/or add new data feeds not previously identified. Additionally, the system may monitor for different key event indications to occur in order to cause data import to be actuated. For example, the system may communicate with one or more data sources to determine when the data source has been updated. As such, the data importing does not have to be continuous, but does not lag real-time. A network user may designate key event indications, allowing the system to be customizable.

Figure 1B:
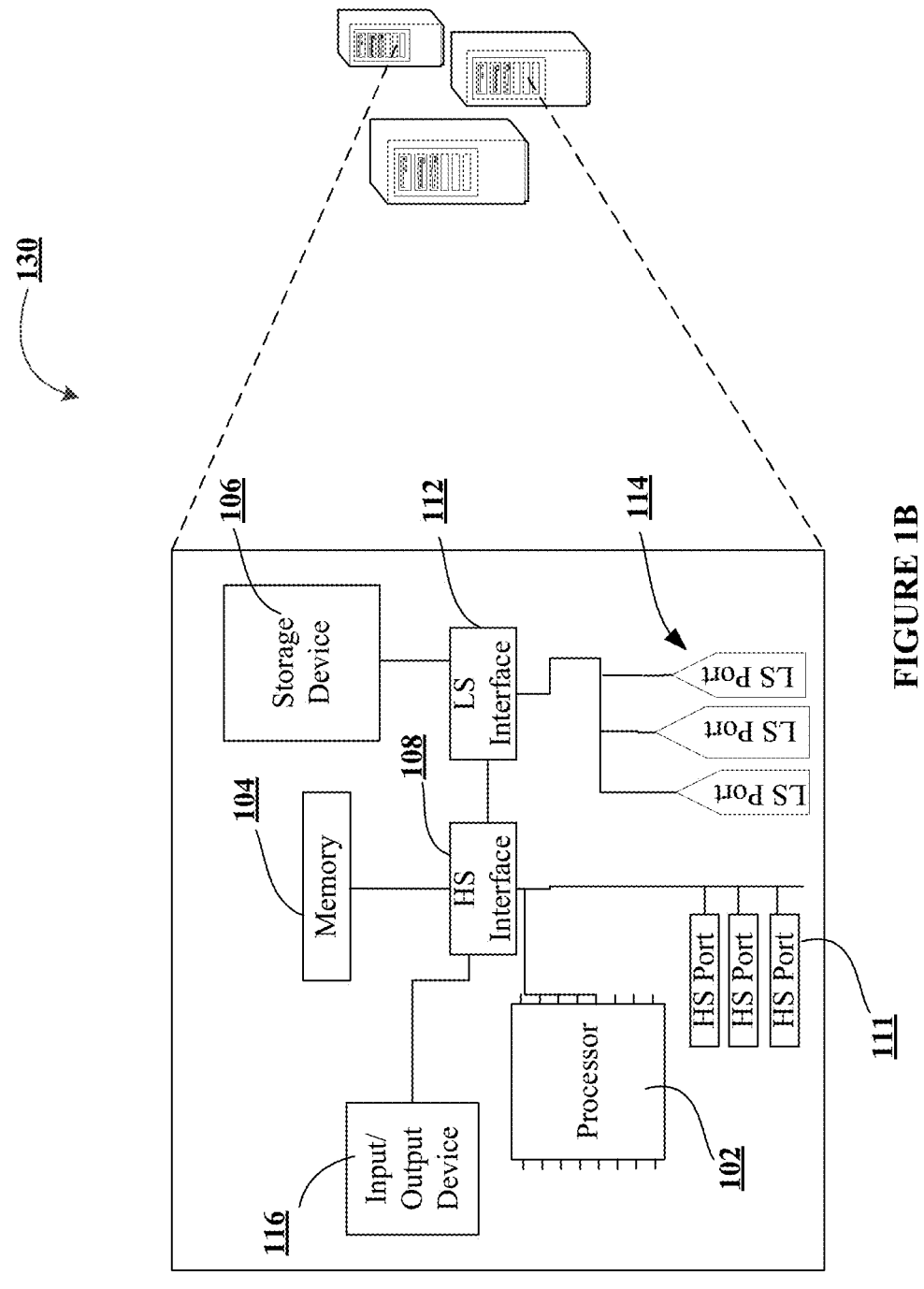
Figure 1C:
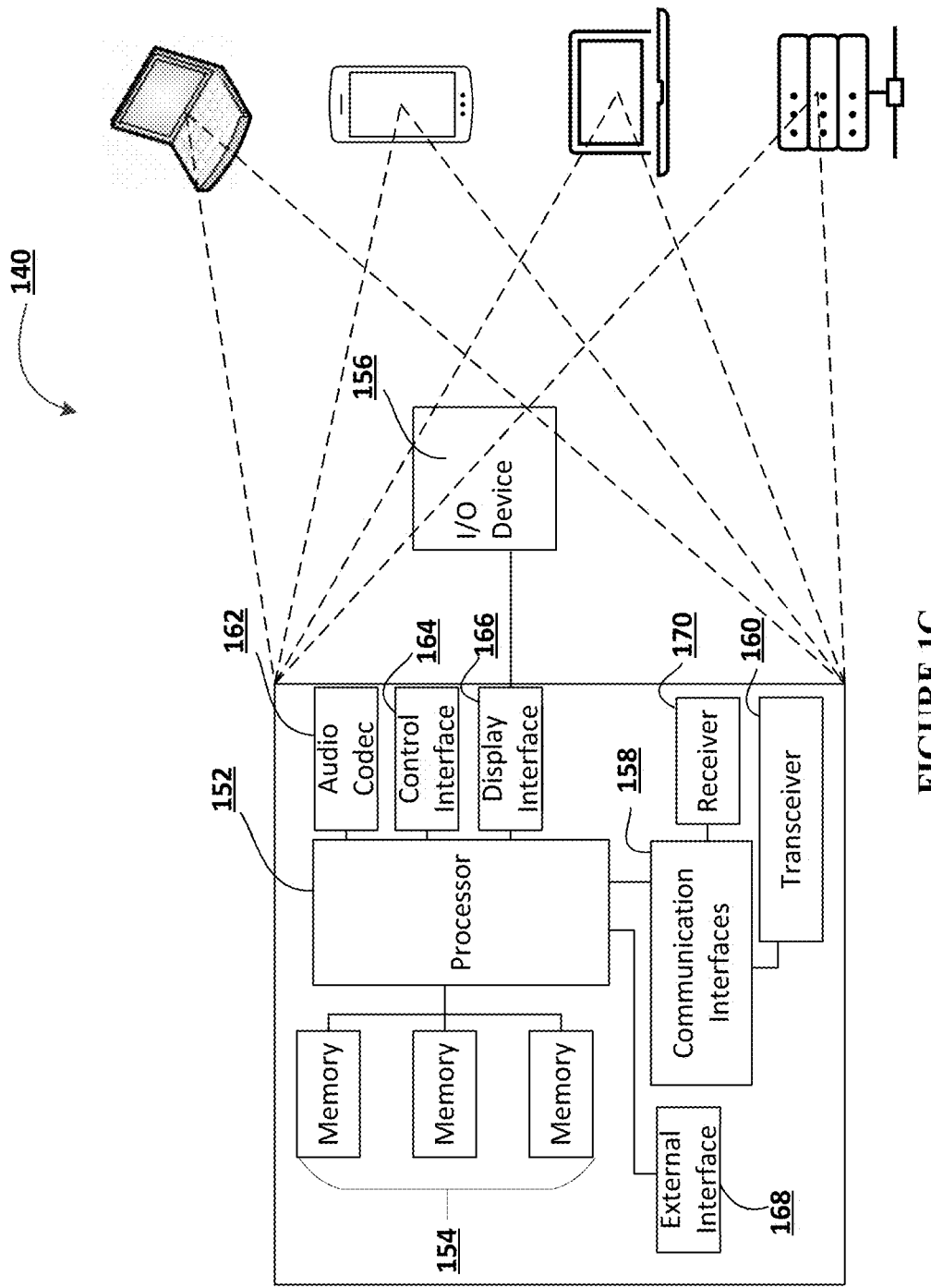

FIGS. 1A-1C illustrate technical components of an exemplary distributed computing environment for interactive automated code generation and modification for data processing, in accordance with various embodiments of the disclosure. As shown in FIG. 1A, the distributed computing environment 100 contemplated herein may include a system 130 (e.g., a flow designer generation device), an end-point device(s) 140, and one or more networks 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, satellite network, cellular network, and/or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through at least one of communication interfaces 158, which may include digital signal processing circuitry where necessary. Communication interfaces 158 may provide for communications under various modes or protocols, such as the Internet Protocol (IP) suite (commonly known as TCP/IP). Protocols in the IP suite define end-to-end data handling methods for everything from packetizing, addressing, and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interfaces 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130. The end-point device(s) 140 may include a communication interface that is configured to operate with a satellite network.

In various embodiments, the end-point device(s) 140 may have multiple communication interfaces that are configured to operate using the various communication methods discussed herein. For example, an end-point device 140 may have a cellular network communication interface (e.g., a communication interface that provides for communication under various telecommunications standards) and a satellite network communication interface (e.g., a communication interface that provides for communication via a satellite network). Various other communication interfaces may also be provided by the end-point device (e.g., an end-point device may be capable of communicating via a cellular network, a satellite network, and/or a wi-fi connection). Various communication interfaces may share components with other communication interfaces in the given end-point device.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
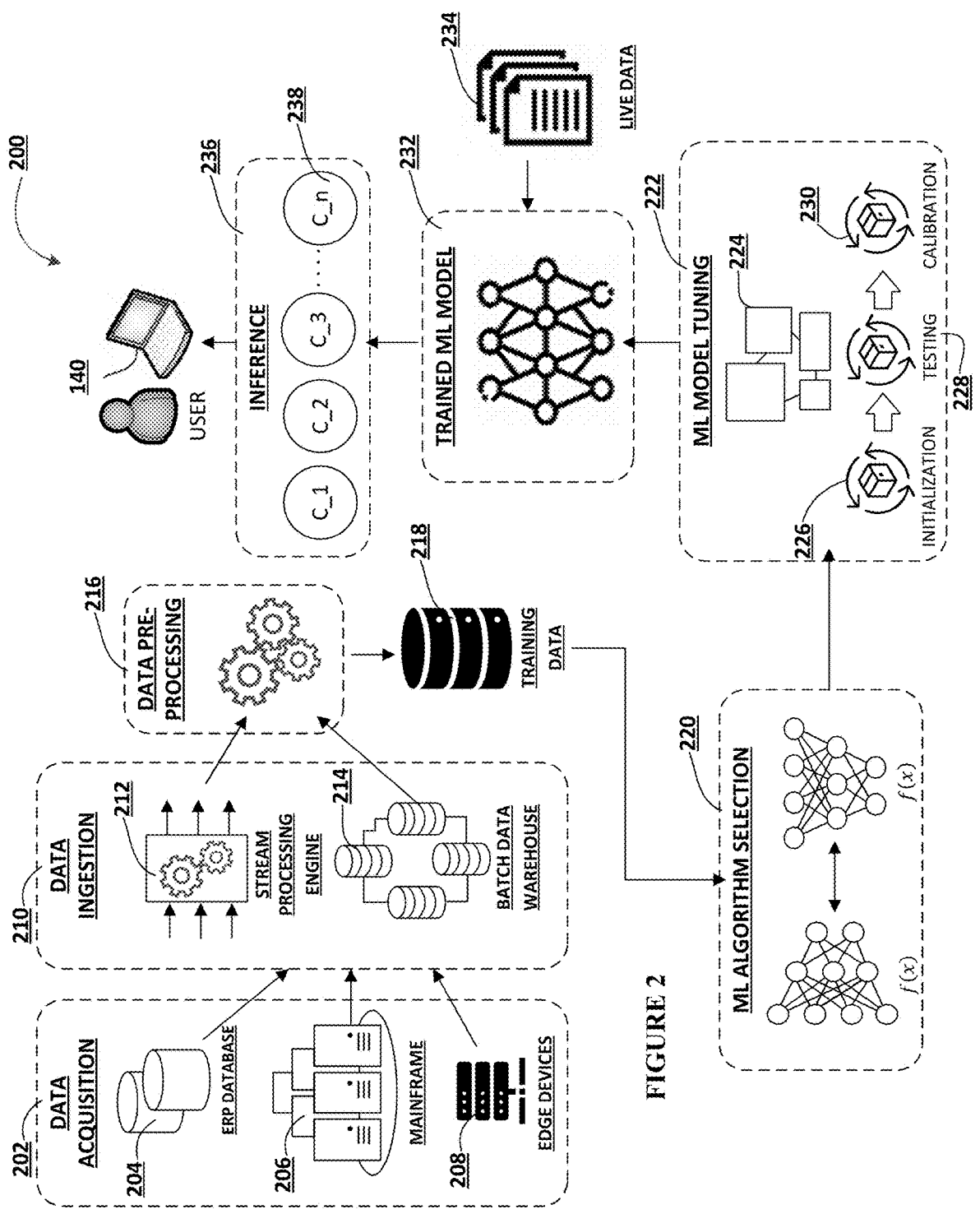
FIG. 2 illustrates an example machine learning (ML) subsystem architecture used to provide interactive automated code generation and modification for data processing, in accordance with various embodiments of the present disclosure.

FIG. 2 illustrates an example machine learning (ML) architecture 200, in accordance with an embodiment of the present disclosure. The ML subsystem architecture may be part of the components of the environment 100 (e.g., system 130). The ML subsystem architecture is used to generate various different components of the flow designer interface.

The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

FIGS. 3A and 3B include a flow chart 300 that illustrates an example method of providing interactive automated code generation and modification for data processing. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. A method of various embodiments may include any combination or subset of the features discussed herein.

Referring now to Block 302 of FIG. 3A, the method includes causing a rendering of a flow designer interface including a flow portion and a plugin portion. An example flow portion is the flow portion 725 shown in FIG. 7. The flow portion may be used to create a flow operation using block (e.g., Blocks 701, 702, 703, 704, 705 of FIG. 7) that are connected to one another to define a flow. Each of the blocks represent a plugin (e.g., a plugin selected from the plugin portion 705).

Figure 7:
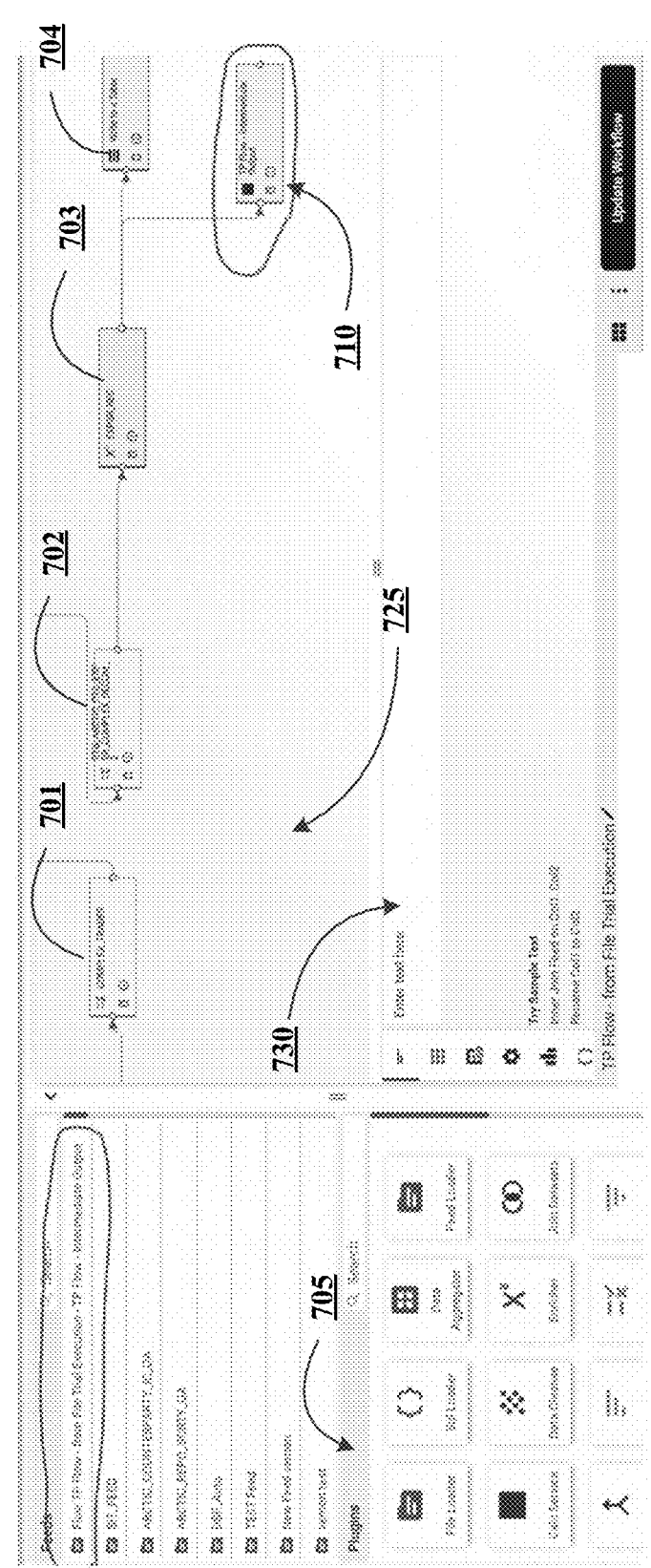
FIG. 7 illustrates an example flow designer interface that includes a flow and a flow output writer, in accordance with various embodiments of the present disclosure.

An example plugin portion is the plugin portion 705 shown in FIG. 7. The plugin portion includes one or more engagement plugin icons. Each of the engagement plugin icon(s) correspond to a plugin. Example plugin icons shown in FIG. 7 include file loader, SQL loader, data aggregator, feed loader, calc service, data cleanse, enricher, join data-sets, among others in the plugin portion 705. Each of the plugins may designate data feeds (e.g., file loader, SQL loader, data aggregator, feed loader, etc.) and/or perform transformations and/or calculations relating to the data sets (e.g., calc service, data cleanse, enricher, join datasets, etc.). In various embodiments, the different plugin types (e.g., input data feed, transformations, etc.) may be designated using different icon coloring (e.g., the input data feeds may be green, and the data transformation may be purple).

Referring now to Block 304 of FIG. 3A, the method includes receiving a first plugin input based on a first engagement of a first plugin icon of the one or more engageable plugin icons. The first plugin input is a selection of a first plugin to be included in the flow portion of the flow designer interface. In various embodiments, the first plugin input may be an engagement with one of the plugin icons of the plugin portion. The engagement may be a click or drag (e.g., a user may drag the plugin icon to the flow portion of the flow designer interface).

The first plugin input may include the selection of the plugin (e.g., which plugin icon from the plugin portion to be selected to be used in the flow portion). Additionally, the first plugin input may include information relating to the location of the first plugin in the flow (e.g., the plugin icon may be drug to the location on the flow portion in which the first plugin is to be rendered).

In various embodiments, the first plugin input and/or inputs received after the first plugin input may include information relating to the first plugin, such as any data feeds, any variables used, and/or the like. In various embodiments, the first plugin may have a predefined value for each of the inputs that are customizable (e.g., via an input from a network user).

Referring now to Block 306 of FIG. 3A, the method includes causing a rendering of a representation of the first plugin corresponding to the first plugin icon on the flow portion of the flow designer interface. Based on the first plugin input, the system causes a representation of the first plugin to be displayed on the flow portion. For example, a first plugin may be represented as a block as shown in FIG. 7 (e.g., Blocks 701, 702, 703, etc.). In various embodiments, the representation of the first plugin may be engageable in the flow portion (e.g., able to connect with other plugin representations and/or access the selected plugin portion of the flow designer interface).

Referring now to optional Block 308 of FIG. 3A, the method includes causing a rendering of a selected plugin portion of the flow designer interface upon reception of the first plugin input. An example selected plugin portion 730 is shown in FIG. 7. In various embodiments, the selected plugin portion 730 may include information relating to a selected plugin. The selected plugin portion may include information relating to any of the plugins shown on the flow portion of the flow designer interface. In various embodiments, upon selecting a plugin to be rendered on the flow portion of the flow designer interface (e.g., first plugin, second plugin, third plugin, etc.), the selected plugin portion may display information relating to the given plugin. Another example selected plugin portion is the adjustment portion 920 in which information relating to the adjustment plugin 910 is shown.

Additionally or alternatively, the selected plugin portion may include information relating to the plugin corresponding to a representation in the flow portion that is engaged. For example, in an example embodiment in which the representation of the first plugin (and/or other plugins) is engageable in the flow portion, upon engagement, information relating to the first plugin (or other selected plugin) may be displayed via a selected plugin portion of the flow designer.

In various embodiments, the selected plugin portion may include one or more customizable fields for the given plugin (e.g., first plugin, second plugin, etc.). For example, a network user may be able to customize certain features of a plugin, such as the variables, data feeds, and/or the like. Additionally, the selected plugin portion may include other information relating to the selected plugin, such as the input data and/or the output data for the plugin.

Referring now to Block 310 of FIG. 3A, the method includes receiving a second plugin input based on a second engagement of a second plugin icon of the one or more engagement plugin icons. The second engagement of the second plugin icon may be the same or similar to the first engagement of the first plugin icon. As such, the second plugin input is a selection of a second plugin to be included in the flow portion of the flow designer interface.

In various embodiments, the first plugin icon and the second plugin icon may be different plugin icons of the one or more engageable plugin icons. Alternatively, the first plugin icon and the second plugin icon may be a same plugin icon of the one or more engageable plugin icons. In various embodiments, each of the first plugin and the second plugin may be various types of plugins (e.g., transformation, data source, etc.). For example, at least one of the first plugin or the second plugin may define an input data feed. In various embodiments, the flow portion may include more than a first plugin and a second plugin. As such, the first plugin and the second plugin may not necessarily be the first and second plugins included in a flow.

The second plugin input may also include a connection indication between the first plugin and the second plugin. The connection indication may be received at the same time as the second engagement of the second plugin icon or separate from the second engagement of the second plugin icon (e.g., the system may prompt the network user to provide the connection indication that indicates the connection between the first plugin and second plugin). The connection indication may include information relating to how the selected plugin should be connected to one or more other plugins. For example, a line may be drawn on the flow portion of the flow designer interface between one or more plugins on the flow portion to indicate the flow of data during execution.

In various embodiments, the AI/ML model(s) may provide recommendations on how each plugin interconnects. For example, the AI/ML model(s) may recommend connections between plugins based on previous flow designs (e.g., in previous flow designs, users may often connect certain plugins together). Additionally or alternatively, the AI/ML model(s) may recommend connections between the plugins based on the type of plugins. For example, certain transformation type plugins may often be connected to a data source type plugin.

Referring now to Block 312 of FIG. 3A, the method includes causing a rendering of a representation of the second plugin corresponding to the second plugin icon on the flow portion of the flow designer interface. The representation of the second plugin may be represented in the same or similar way that the first plugin is represented in the flow portion of the flow designer interface.

In various embodiments, the flow portion of the flow designer interface may connections between the renderings of the various plugins, such that the flow of data is shown between plugins. For example, the representation of the first plugin and the representation of the second plugin on the flow portion may be connected based on the second plugin input. The connection may be represented as an arrow with the direction of the arrow indicating the direction in which data moves through the plugins during the flow execution. For example, in an instance the arrow is pointing from the representation of the first plugin in the direction of the representation of the second plugin, the data moves from the first plugin to the second plugin during operation. In various embodiments, a double ended arrow may indicate that some data in the flow is moving in both directions (e.g., the first plugin may process data, then the second plugin may process the data processed by the first plugin, and then the first plugin may again process the data processed by the second plugin).

Referring now to optional Block 314 of FIG. 3B, the method includes receiving a third plugin input based on a third engagement of a third plugin icon of the one or more engagement plugin icons. Just as the first plugin input and the second input selection, the third plugin input is a selection of a plugin (e.g., a third plugin) to be included in the flow portion of the flow designer interface. The third plugin may be the same or different than either of the first plugin or the second plugin.

The third plugin input may also include a connection indication between the third plugin and other plugins represented in the flow portion (e.g., at least one of the first plugin or the second plugin). The connection indication for the third plugin may be received at the same time as the third engagement of the third plugin icon or separate from the third engagement of the third plugin icon (e.g., the system may prompt the network user to provide the connection indication that indicates the connection other plugins). The connection indication may include information relating to how the selected plugin should be connected to one or more other plugins. For example, a line may be drawn on the flow portion of the flow designer interface between one or more plugins on the flow portion to indicate the flow of data during execution.

In various embodiments, additional engagements may indicate additional plugins to be represented in the flow portion. For example, a fourth engagement of a fourth plugin icon may indicate a fourth plugin to be included in the flow portion, a fifth engagement of a fifth plugin icon may indicate a fifth plugin to be included in the flow portion, and/or the like.

Referring now to optional Block 316 of FIG. 3B, the method includes causing a rendering of a representation of the third plugin corresponding to the third plugin icon on the flow portion of the flow designer interface. The third plugin may be represented in the flow portion of the flow designer interface, just as the first plugin and/or the second plugin are represented. The third plugin may be the same or a different plugin than the first plugin and/or the second plugin. As such, two or more of the first plugin, second plugin, and third plugin may be the same plugin. Alternatively, each of the first plugin, second plugin, and third plugin may be different plugins.

While the method is discussed in reference to a first plugin, a second plugin, and in some embodiments, a third plugin, various embodiments of the present disclosure may include any number of plugins included in a flow with each plugin included in the flow portion of the flow designer interface.

In various embodiments, the flow portion of the flow designer interface may connections between the renderings of the various plugins, such that the flow of data is shown between plugins. As such, the representation of the third plugin is connected to at least one of the representation of the first plugin or the representation of the second plugin based on the third plugin input.

Referring now to Block 318 of FIG. 3B, the method includes generating a flow operation based on the flow portion of the flow designer interface. In various embodiments, a flow operation may also be called a flow. The flow may include each of the plugins represented in the flow portion of the flow designer interface. As such, generated flow operation comprises one or more operations to execute the flow designed in the flow portion (e.g., the data may be processed by one plugin in the flow portion and then transmitted to another plugin in the flow portion, and so on).

As each plugin is individually pre-coded, the flow generated consists of operations in which the plugins interact with one another. For example, data sets may be received by a first plugin, processed and output to the second plugin to be processed. In various embodiments, the flow operation generated includes each of the plugins represented in the flow portion of flow designer interface. For example, in an instance in which the first plugin and second plugin are represented in the flow portion of flow designer interface, the flow generated includes each of the first plugin and second plugin.

Referring now to optional Block 320 of FIG. 3B, the method includes causing an execution of the flow operation generated based on the flow portion of the flow designer interface. In various embodiments, a flow may be executed using the various examples discussed herein, such as via the scheduler. As the generated flow operation discussed in reference to Block 318, the flow operations include the code necessary to carry out each of the plugin operations. As such, the system is configured to execute the flow as designed.

Various operations of the system are detailed in reference to FIGS. 4-18. Each of the operations may be included in the method discussed above in reference to FIGS. 3A and 3B. Various embodiments of the present disclosure provide a web-based no-code visual development platform via a flow designer interface that allows complex data compilation, manipulating, and/or the like without requiring complex coding skills. Various embodiments of the platform include data ingestion, data quality checks, data rules, flow creation and modification, flow execution scheduling, calculation integration, and/or various other features into an interactive environment (e.g., a flow designer interface) that provides an end-to-end solution from determining data sources to reporting and analytics. The system also supports data enrichment, data transformation, process automation, and/or the like.

In various embodiments, the system may include a data ingestion layer of the platform. The data ingestion layer allows configuration of a driven ingestion layer in which the connection parameters to connect with data sources of various data store types may be configured. As such, the system may be capable of loading a large number of rows of data.

In various embodiments, the system may generate a graphical user interface (e.g., part of a flow designer interface discussed herein) with a data feeds interface may be useful to define metadata about different types of input data which the system can accept. In various embodiments, the system may receive an input from the end-point device that defines the file/table structure, details about actual file and location where files are available to pull. Data can be read into the system through a file feed (FIG. 4), SQL loader (FIG. 5), and/or through other workflows.

Figure 4:
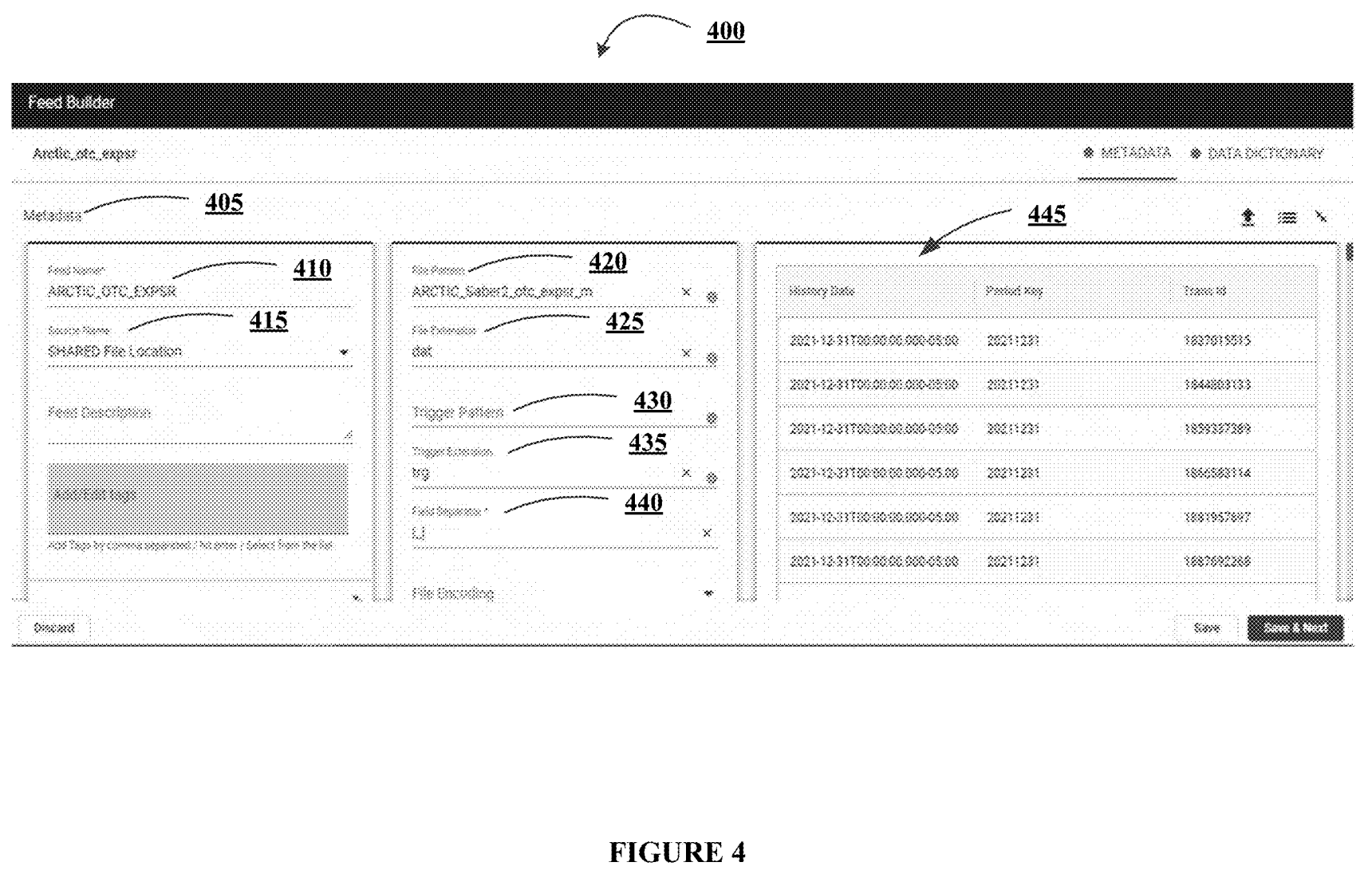
Figure 5:
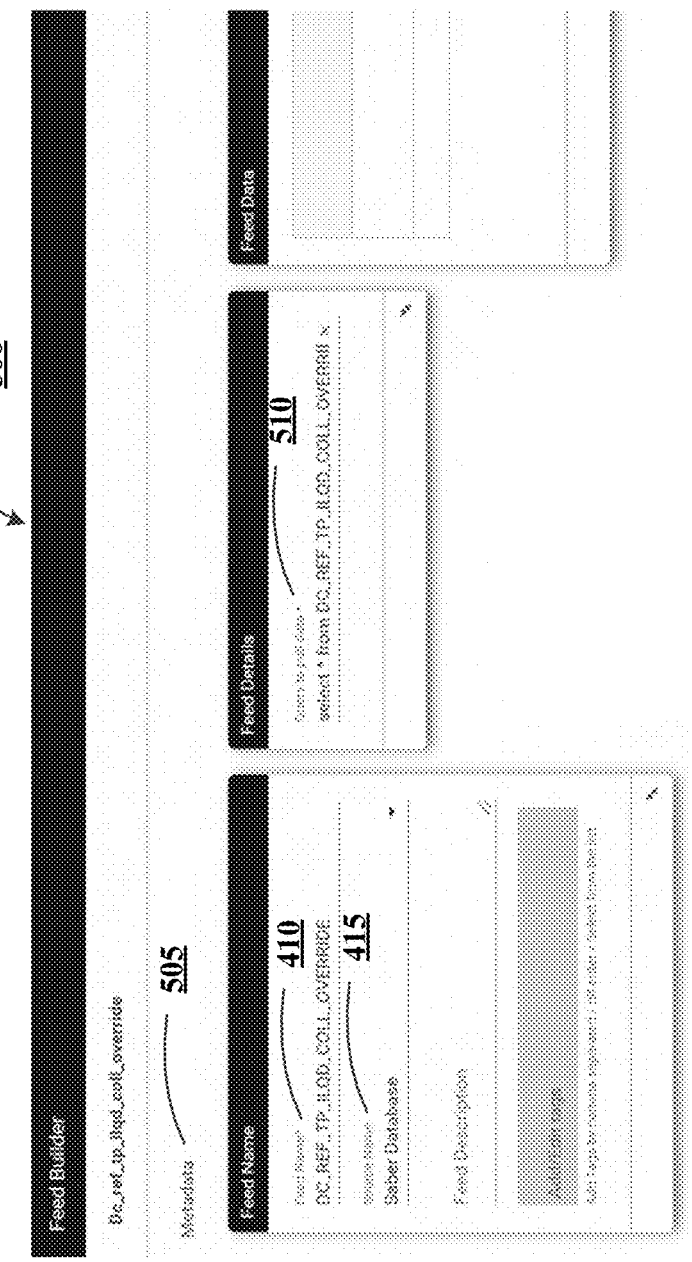
FIG. 5 illustrates another example feed builder that includes information relating to data feed that may be rendered to a flow designer interface, in accordance with various embodiments of the present disclosure.

As shown in FIG. 4, the feed builder 400 may include information relating to the data feed (e.g., the source of the data). The data feed may be selected by a user (e.g., from one or more potential data feeds) or entered by the user (e.g., the user may input information relating to the data feed). The metadata page 405 of the feed builder 400 may include metadata relating to the data feed, such as feed name 410, source name 415, file pattern 420, file extension 425, trigger pattern 430, trigger extension 435, field separator 440, and/or previous inputs 445 received from the feed and/or source. In various embodiments, the selection may be changed by a user or fixed by the system. FIG. 5 illustrates another example metadata page 510 of feed builder 500 in which the feed is using an SQL loader. As such, the metadata page may include feed name 410 and source name 415, just as the metadata page 410 shown in FIG. 4. However, instead of file pattern, the feed details may include a selection for the query to pull data 510. As such, the query used for the SQL loader is shown.

Figure 6:
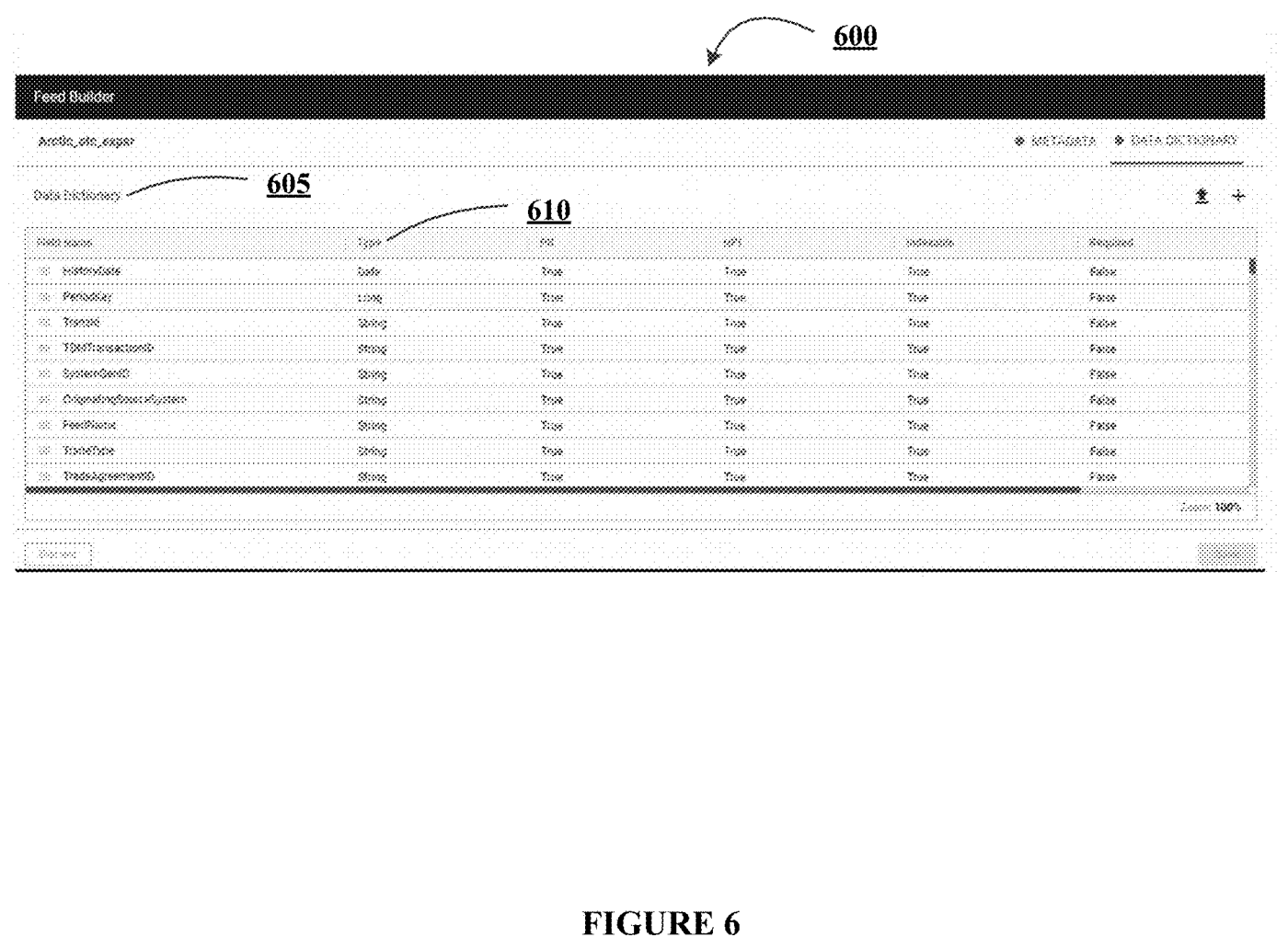

Referring now to FIG. 6, the system may also include data dictionary functionality, which is capable of knowing the state of data within the flows discussed herein. The system is capable of determining the exact state of any data at any point in a flow process. In order to determine the data definition of any data, the system may determine two attributes for the data. Namely, the system determines the data type and value of the data. Any changes to the attributes are monitored at each step along the flow. To do this, the initial definition of data type attribute is assigned automatically by the system based on the data, with additional ability for the user to modify the assigned type in the feed configuration module. The data type is shown in Column 610 of the feed builder 600 shown in FIG. 6. Example data types may include string, integer, decimal, Boolean, date, timestamp, string array, number array, and/or the like. Additional information included in the data dictionary section 605 of the feed builder may include the field name, indexable (e.g., true/false) columns, required (e.g., true/false) columns, and/or the like.

As data is changed and/or updated by different plugins during a flow, the system may evaluate the data dictionary before and/or after each plugin is executed on the flow based on the user configurations to update the data dictionary. The data dictionary may be continuously evaluated. At each plugin of the flow, the data may have new fields added and/or existing fields modified or deleted, making the traceability of the fields transparent in the system.

In various embodiments, the system may source data from different upstream sources for transformations to derive new data. The data loading in the feed module is configured with an initial static data dictionary and sent to the flows for use. As such, the data dictionary is defined before the flow is executed and then updated during execution of the flow. Additionally, in an instance in which data is adjusted and/or enriched, as discussed herein, and new data is added to the data sets, the data dictionary may be updated to include the new data added. For example, an enricher plugin may add a new column to a data set and the data dictionary may be updated to include the data definition for one or more values added to the data.

In various embodiments, the system may include a flow designer that is configured to organize the operations of the system herein. For example, the flow designer is configured to perform operations relating to workflows, rules, calculations, reports, analytics and/or the like. In various embodiments, the system may include a flow designer interface that includes individual plugins that each perform a transformation on the data in the flow. The flow designer interface may allow multiple flows, where each flow is an individual transformation with a flow input and a flow output. Each flow is independent from the other flow, though in some instances, the output of a flow may be used in other flows. An example flow may consist of determining data sources, data transformation, data writing, data reporting steps, and/or the like.

In various embodiments, the flow designer interface represents each plugin as a block and allows for the blocks to be visually connected to one another to represent the transformations being completed. An example flow designer interface is shown in FIG. 7. The flow designer interface 700 may include a plugin portion 705 that includes available plugins that can be used in the flow portion 725. As shown, the plugins may be represented in the flow as blocks (e.g., blocks 701, 702, 703, 704, and 710). As such, each flow may be connected to one another (e.g., as shown Block 702 leads to Block 703, which leads to both Blocks 704 and 710). Within each plugin users can define specific rules, logic, filters, provide data enrichments, data transformation, complex calculations, user defined fields, aggregate data, and/or the like.

In various embodiments, the system may include an end-to-end modularized data platform that enables users to digitize and optimize processes and workflows. To do this, the system combines data ingestion, data quality rules, business rules, workflows, calculation integration, testing, and/or the like, into maneuverable design environments. Additionally, the system provides an end-to-end solution from determining data sources to reporting & analytics.

In various embodiments, the system may include a flow designer assistance via AI functionality. As such, the system monitors users during operation of the flow designer platform and may provide recommendations and/or corrections to the actions by the user. For example, the system may automatically correct workflow steps in an instance in which a change is made in any plugin and/or provide suggestions for improving plugin configuration when any config changes are made. As such, the system allows for a user to make required changes at all appropriate places without having to manually scan through the configuration of every single plugin.

In various embodiments, the flow designer allows for plugins to be easily moved, added, removed, and/or changed in the system. However, the AI functionality allows for safeguards to protect the underlying data from being damaged and/or manipulated incorrectly. As such, the system is configured to monitor changes to the flow designer for functionality. For example, a user who has developed a process through 40 individual steps using 8 different data inputs on the workflow designer may want to make changes in steps 12 and 18 along with changes to the file structure for 2 input files. The system scans each workflow component (e.g., plugins) to determine which workflow components are affected, thereby reducing the time required to make adjustments (e.g., typically, the user would be required to manually scan all 40 individual workflow steps to identify which steps would be impacted by these changes). The system may provide prompts to the user via the platform interface (e.g., via a graphical user interface) that assist the user in updating any workflow components that are affected by the change in the workflow.

Referring now to FIG. 7, the system may include one or more flow output writers that are used to break down processes into smaller, more understandable processes. The flow output writer (e.g., Block 710 of the flow designer interface 700) allows for the output of a flow available to be an input/feed to be used in other flows. To do this, the system generates the output of a plugin at a run time and creates an automatic data feed which can be used as an input into the next flow. As such, the output of flows may be used in other flows, as a single block of the flow, allowing multiple flows to be used together without requiring each individual step of the flow to be manually entered.

In various embodiments, the system may also include an embedded flow plugin that allows for the flow to behave like a custom function where arguments can be changed and executed for different use cases. As such, the system may allow for the input of the flow to be changed, while maintaining the operations of the flow to remain the same, allowing the flow to be executed on different data inputs. The embedded flow is unique as the system allows for a flow to be reused and/or repurposed using different inputs with the same flow operations. As such, a flow may be represented as a single plugin to be used as an embedded flow within another flow.

Figure 8:
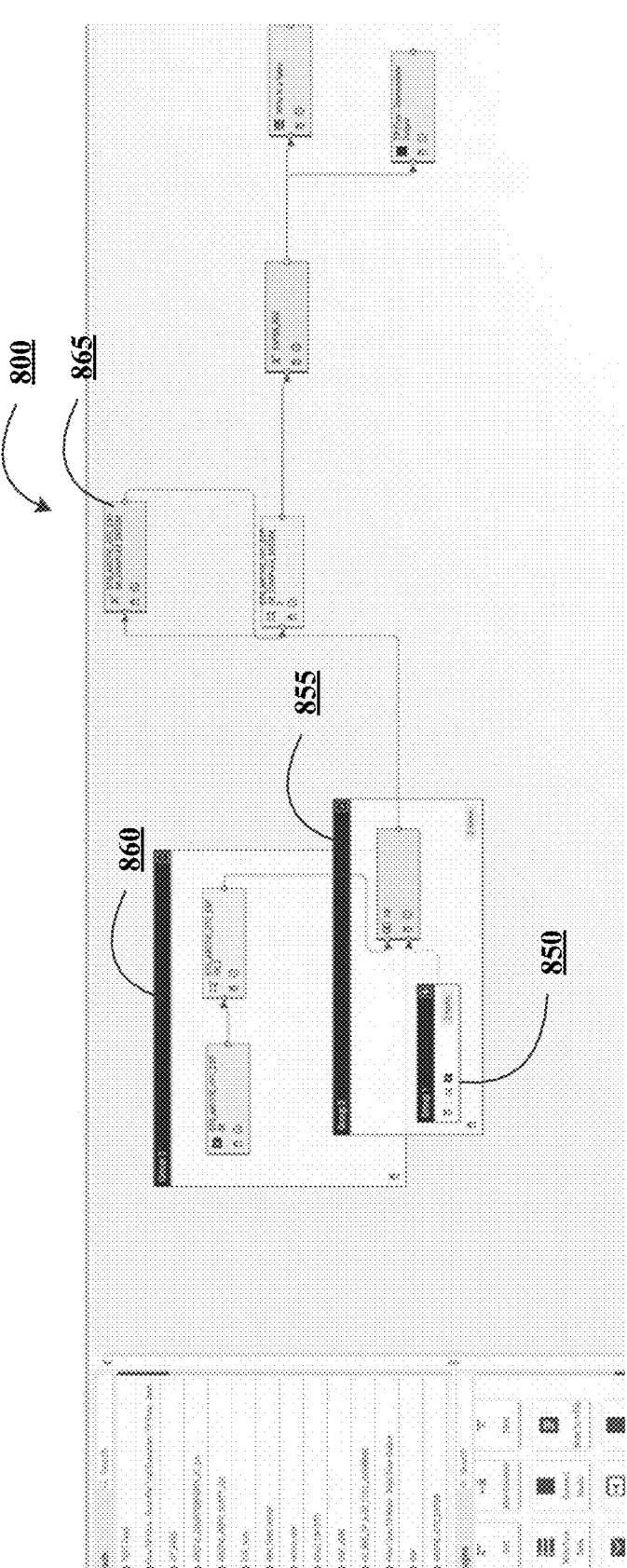
FIG. 8 illustrates an example of flow designer interface 800 including a multi-level grouping functionality, in accordance with various embodiments of the present disclosure.

Referring now to FIG. 8, an example of flow designer interface 800 is shown using a multi-level grouping functionality of various embodiments. Since flows may include large number of individual operations (e.g., plugins that make up the flow), the system may use grouping functionality in order to allow for the entire flow to be represented on a single flow designer interface. As such, each group may include one or more operations in which the data is being transformed. As such, the flow may include a first group (e.g., Group 1 850), a second group (e.g., Group 2 855), and a third group (e.g., Group 3 860). The individual groups may be connected to one another. For example, as shown in FIG. 8, Group 1 850 is part of Group 2 855, and Group 2 receives an input from Group 3 860. The flow designer interface 800 allows for the groups to be minimized or expanded. For example, Group 1 850 is minimized and does not show the operations therein, while Groups 2 855 and Group 3 860 are expanded and show the individual plugins. As such, the groups act as a plugin in the flow designer interface. In various embodiments, the groups may also be connected to other plugins. As shown, Group 2 is an input for Block 865. In various embodiments, the groups may be customized, such as a customizing the name of the group, to provide additional information relating to the group.

In various embodiments, multi-level grouping allows for the flow designer interface to have a simplified visual display that allows for users to view large numbers of operations within a single interface.

Figure 9A:
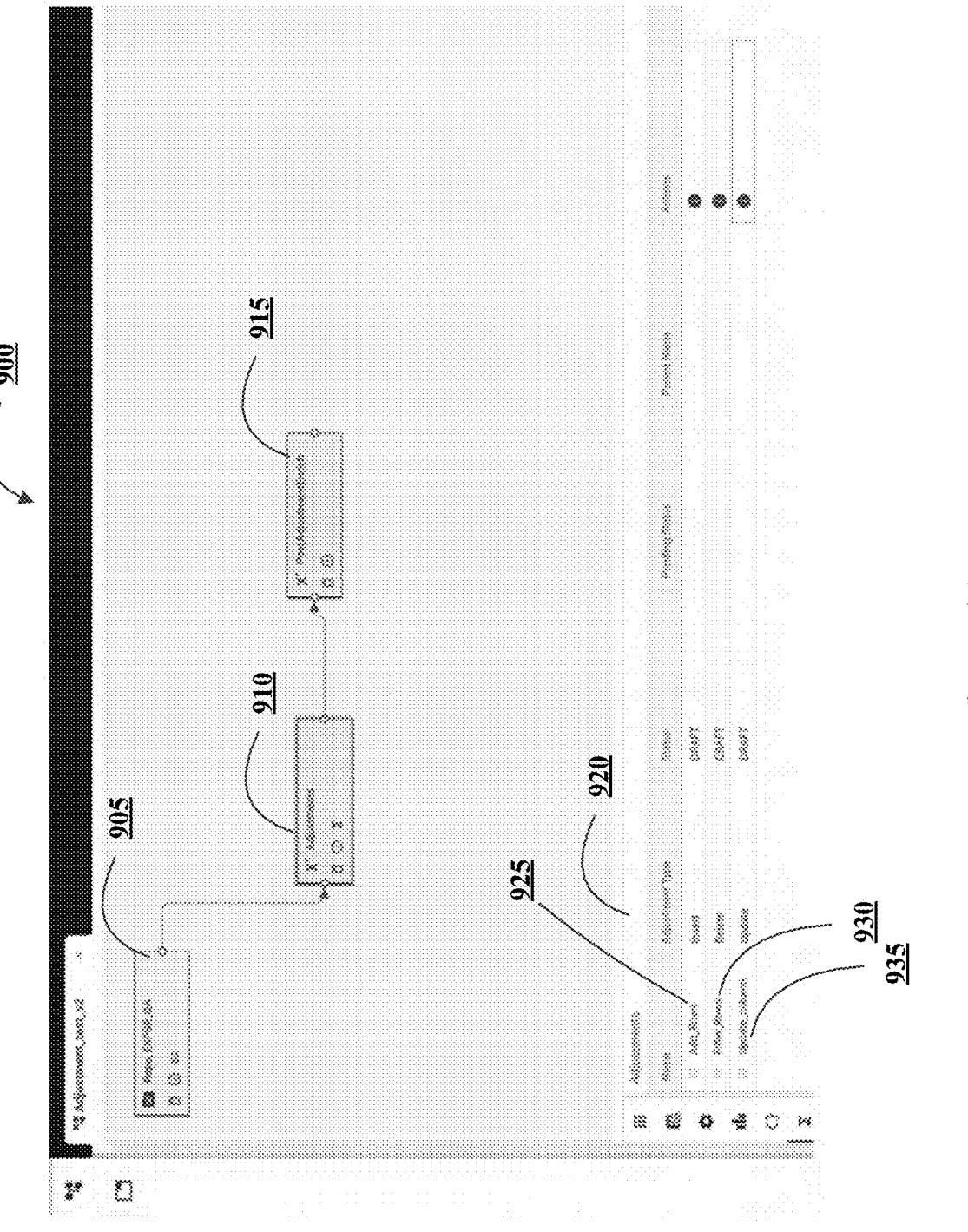
FIGS. 9A and 9B illustrate an example adjustment plugin, in accordance with various embodiments of the present disclosure.
Figure 9B:
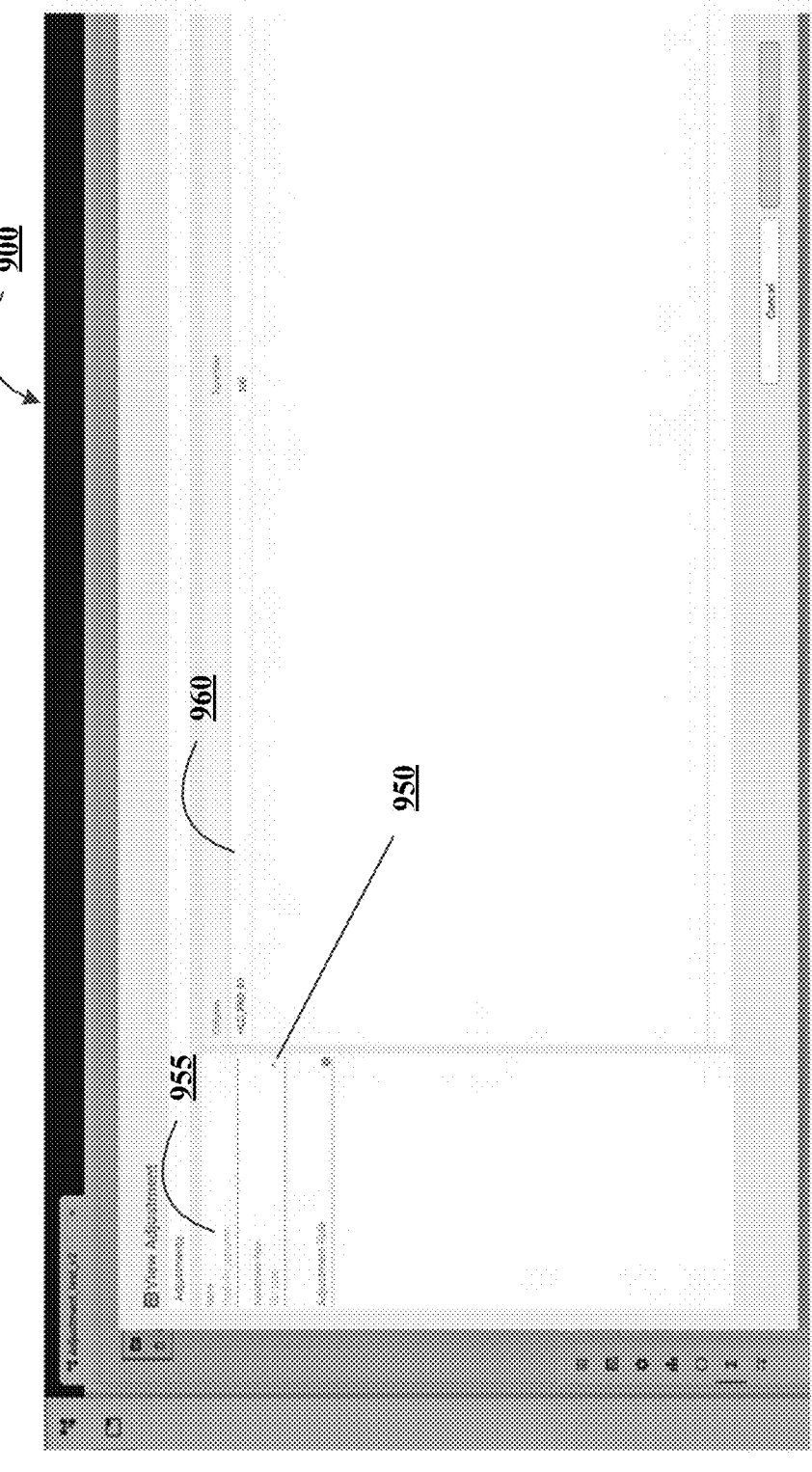

Referring now to FIGS. 9A-9B, an adjustment plugin is shown, including how the adjustment plugin may be placed into a flow designer interface and the adjustment plugin may be adjusted by the used. FIG. 9A shows the adjustment plugin 910 placed on the flow designer interface 900. As shown, input from a repository 905 may be adjusted via the adjustment plugin 910. The data may then be enriched via the enricher plugin 915 after the data adjustment. The adjustment 910 may be modified via the adjustment portion 920 of the flow designer interface 900. The adjustment portion 920 may include the type of adjustments made to the data during the adjustment. For example, the input from a repository 905 may be adjusted by adding new rows (e.g., Add_Rows 925), filtering out some rows (e.g., Filter_Rows 930), and Updating some columns (e.g., Update_column 935). In various embodiments, the adjustment plugin allows for data to be adjusted after data has been manipulated and/or compiled. As shown in FIG. 9B, the adjustments made in the adjustment plugin may be changed via the flow designer interface 900. As shown, the adjustment type 950 may be changes, as well as the adjustment name 955, and the portion of the data being adjusted (e.g., HLD_PRD_83 960).

In various embodiments, different types of adjustments may be made to data in the flow. Example adjustment types include create (e.g., add rows and/or columns), filter (e.g., remove columns and/or rows), and/or update (e.g., change values in data). The adjustment plugin allows for adjustments to be applied at any step within the executed workflows in order to modify the calculated output dataset. The adjustment plugin may require multiple approvals before being implemented into a flow. For example, the system may receive an adjustment request (e.g., via a first user, such as an analyst), and an adjustment approval from an authorized approver (e.g., a second user, such as a manager) before the adjustment plugin is used in the flow. In various embodiments, the system may allow the adjustment to be toggled between applied and not applied. As such, the data may be viewable in the flow designer platform as both adjusted and not adjusted by a user.

In various embodiments, the system allows users to adjust existing flow components (e.g., plugins) on an executed workflow leveraging pre-defined adjustment types. As such, the adjustment plugin allows for the flexibility to introduce changes to the data flows, while preserving the integrity of the data. Example of adjustments include inserting new rows of data, updating sets of data by defining conditions for one or multiple columns meeting specific analytics requirements, filtering or removing unwanted rows or columns of data, and/or the like. In various embodiments, one or more adjustments may be deactivated and activated within the flow designer interface, allowing adjusted data to be reverted to an unadjusted state.

In various embodiments, the adjustment plugin supports high volumes of data, complex data transformation, and real-time analytics changes using one or multiple plugins.

Figure 10:
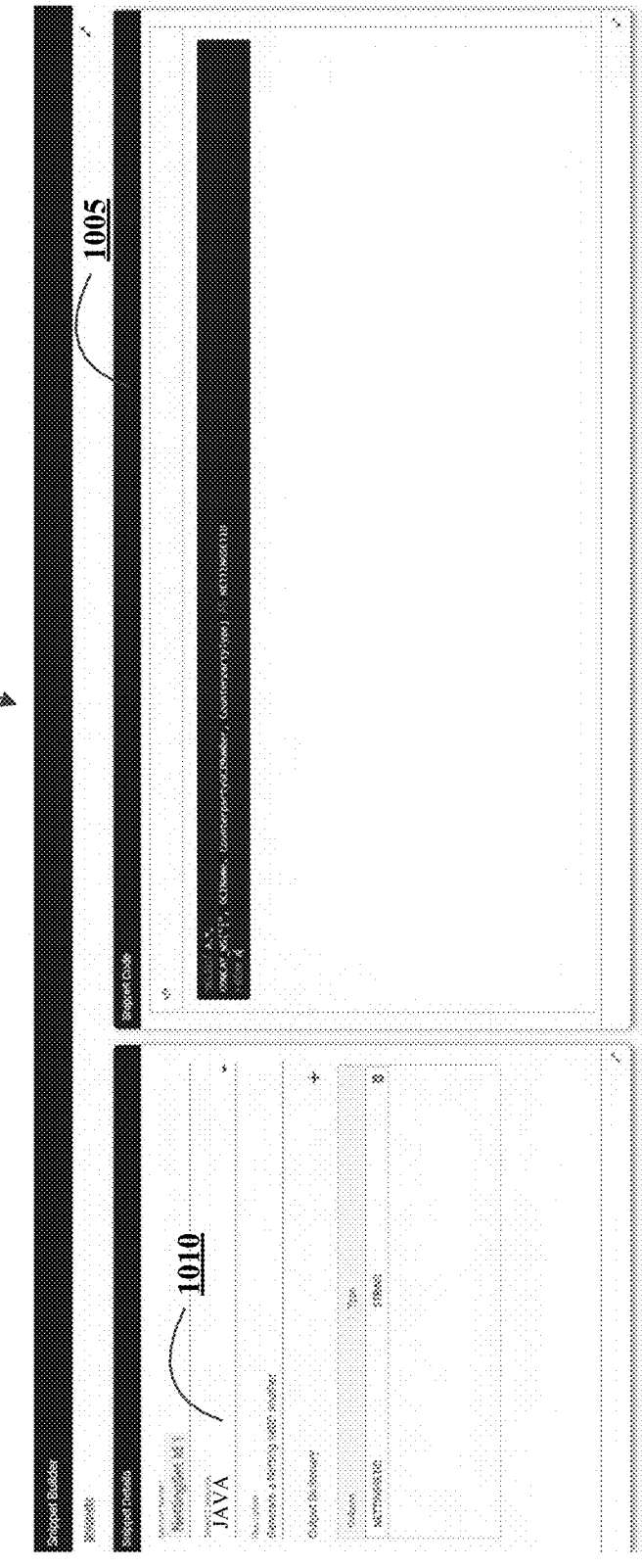
FIG. 10 illustrates an example snippet function used to create custom snippet plugins, in accordance with various embodiments of the present disclosure.
Figure 11:
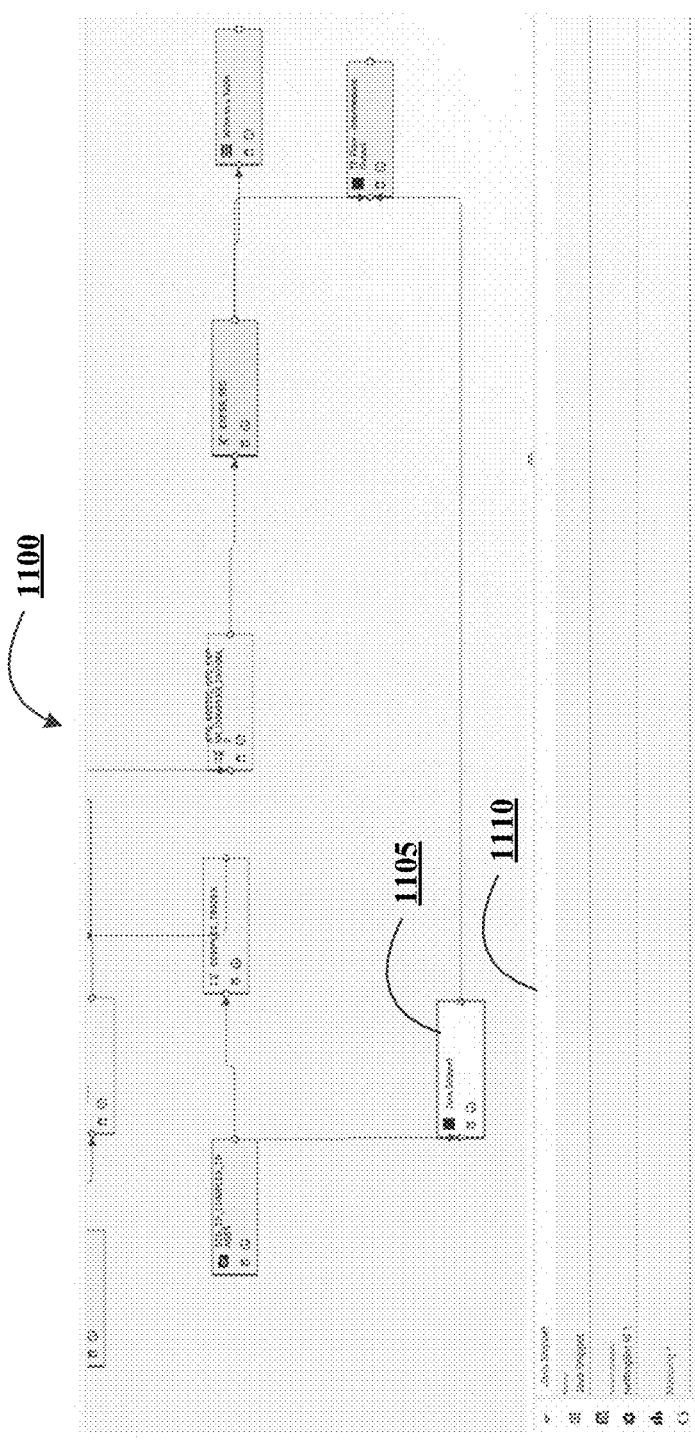
FIG. 11 illustrates a custom snippet plugin being used in a flow, in accordance with various embodiments of the present disclosure.

Referring now to FIGS. 10 and 11, the system may also provide an ability for users to input custom code for one or more plugins in the flow. While the plugins are each able to be used without needing any code, some users may also want to add new or otherwise non-supported functionality that are not covered by the plugins offered by the system. As such, the system may provide a code entry system and the system may also include code verification in order to assure code operability. In various embodiments, the system may include an advanced, snippet function in which custom code may be used in a flow.

Snippet function allows for users to create custom snippet plugins via custom code. The custom plugins may then be available across the flow network (e.g., other network users may be able to use the custom plugin in the given user's own flows). In various embodiments, the code created using the Snippet function can be made viewable to all network users or viewable to select network users. For example, a network user may be able to use a custom snippet plugin without having access to the code off the custom snippet plugin. As such, the custom snippet plugin may operate just as other plugins for a network user (e.g., the custom snippet may be a block in the plugin portion of the flow designer that can be added to a flow). Additionally, the custom snippet plugins may be used in multiple different plugins, allowing a network to customize the flow designer interface based on the specific use of the network (e.g., an entity may use the flow designer for a specific use case).

As shown in FIG. 10, the snippet function may have a specific page 1000 of the flow designer interface that allows for the snippet code to be added via the snippet code portion 1005 of the interface and assigned as a custom snippet plugins. The system may support various different computing languages, such as Java, Python, R, SQL, and/or the like. In various embodiments, the language may be autodetected or selectable by the inputting user (e.g., the Select Language 1010 is JAVA in FIG. 10). The system may include coding verification and/or review that allows the code to be approved before being used as a plugin.

FIG. 11 illustrates a custom snippet plugin being used in a flow. As shown, the custom snippet plugin 1105 may be used as a regular plugin in a flow designer interface (e.g., flow designer interface 1100). As shown in the JAVA snippet portion 1110 of the flow designer interface, information relating to the custom snippet plugin may be displayed, such as selecting which snippet to use (e.g., the same snippet is "NettingSet id 1" is selected as the custom snippet plugin is named in FIG. 10). As such, the custom snippet plugin may be used with no requirements for programming languages of other plugins in the flow.

In various embodiments, the system includes an enricher plugin tool. The enricher allows a user to carry out data manipulation tasks across one or more records. The data manipulations may include any function used to modify data. For example, the data manipulation may range from simple mathematical functions, string-based manipulation, if/else style conditional checks, and/or the like. Various different functions of the enricher may be provided via a graphical user interface. In various embodiments, the enricher may also include the functionality of the adjustment plugin discussed herein.

In various embodiments, the enricher allows for a user to take a data set that has been created (e.g., via the data flow designer discussed herein) to be adjusted without requiring the data to be re-processed. For example, a user may want to add new columns or other functions to a data set. The enricher provides this functionality with minimal to no coding requirements.

In various embodiments, the system may include one or more rule engines that may be designated via the flow designer interface. Example rule engines include data quality rules, transformation rules, statements rules, truth tables, matrix rules, sequential rules, and/or various other rule engines. As such, the rule engines may be used as individual plugins in the flow designer interface.

Figure 12A:
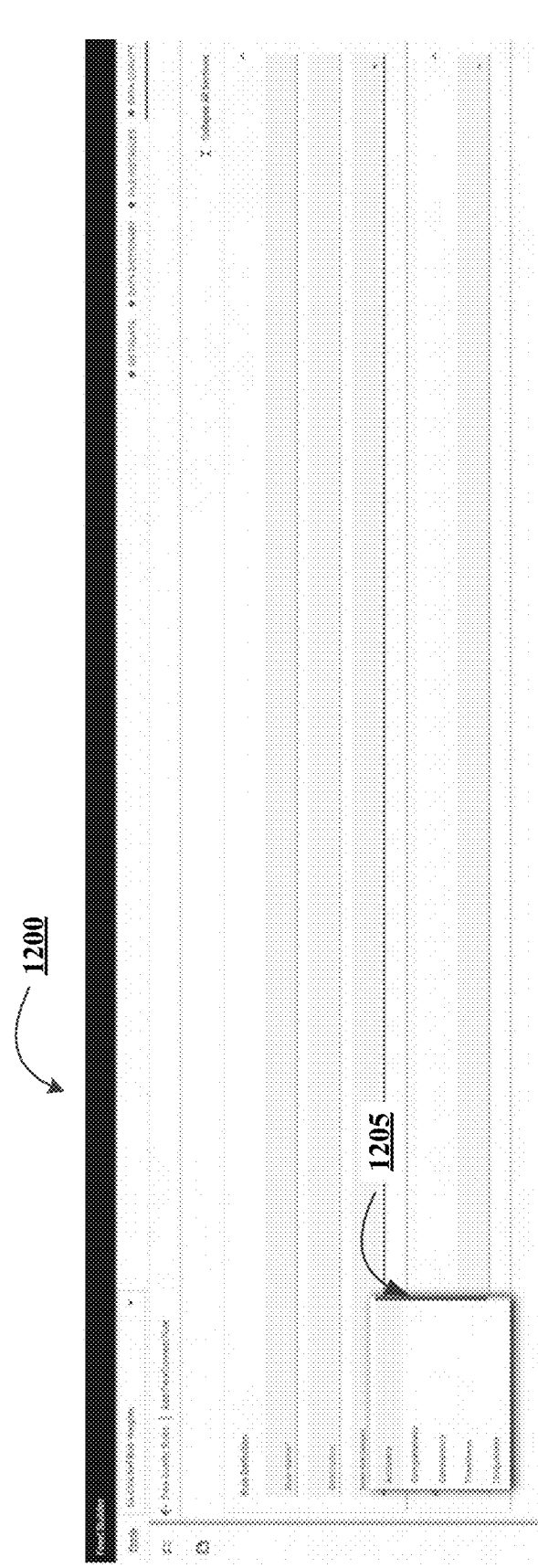
FIGS. 12A-12C illustrate various user interfaces used to generate a data quality rule, in accordance with various embodiments of the present disclosure.
Figures 12B, 12C:
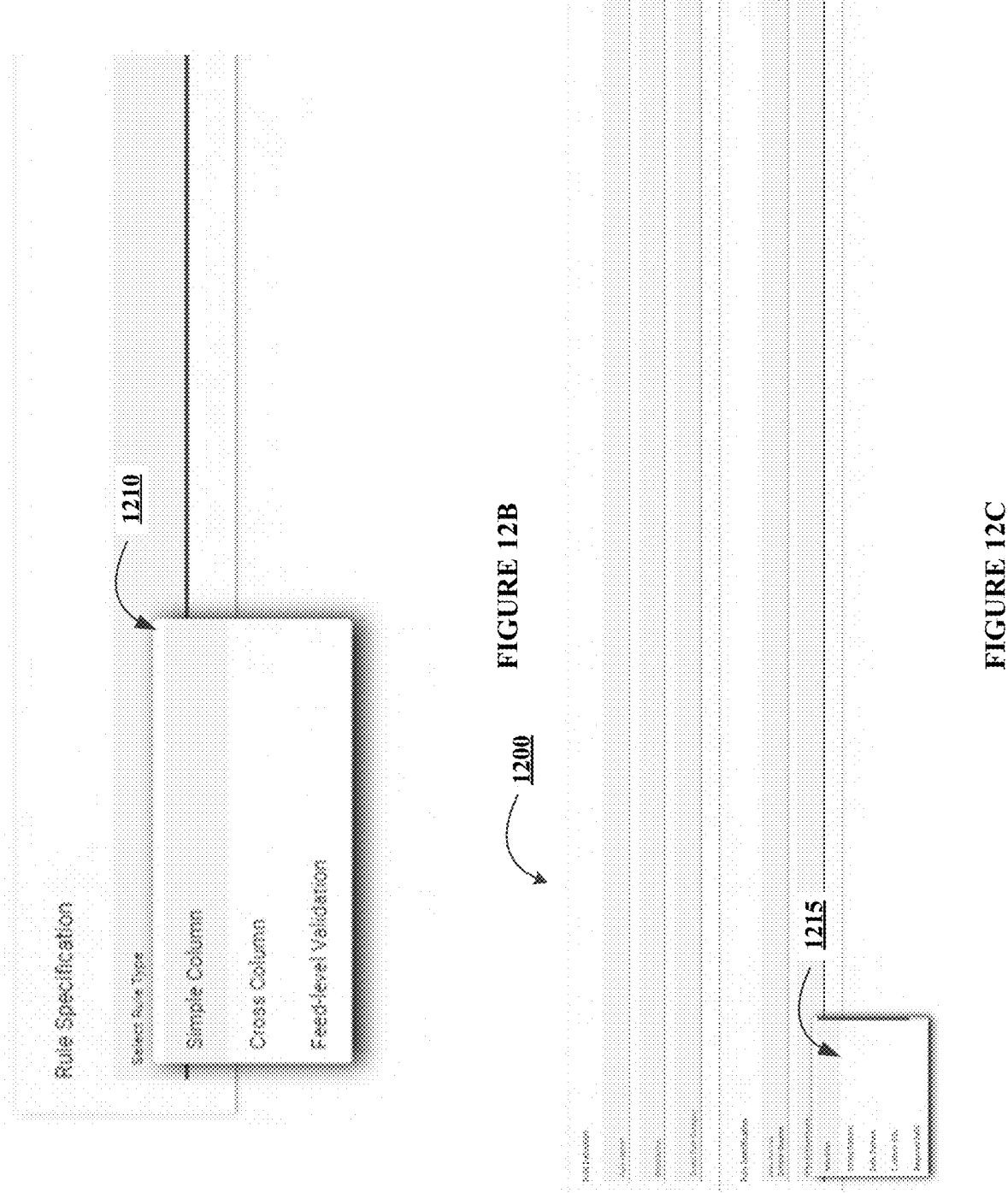

Referring now to FIGS. 12A-12C, various user interfaces are shown to generate a data quality rule. In various embodiments, the system may include data quality rules. The data quality rules may be used to identify data issues before or during the flow execution. The data quality rules may be automated. As such, data quality rules are defined for a particular field in a dataset or aggregate rules for the entire feed. The system, via the data quality rules, may test whether the data set meets the defined criteria, whether a data set contains data in required fields, and/or the like. As such, the system may determine one or more issues relating to the data set.

In various embodiments, the system may use the data quality rules to monitor data accuracy (e.g., the accuracy of data in fields), data validity (e.g., checking whether the values are in specific format or not), data completeness (e.g., completeness of values and checking if all data is present), data transmission timeliness (e.g., timeliness of files arrival), consistency of data (e.g., checking the duplicates and consistency), data integrity (e.g., checking whether reference values are populated as expected or not), and/or the like. As shown in FIG. 12A, a data quality rule generator page 1200 may be included in the flow designer interface to allow for data quality rules to be defined. The rule category may be entered by the user (e.g., entered manually or selected from a drop-down menu, such as a selection menu 1205).

In various embodiments, data quality rules may be created at the feed level and/or the flow level discussed herein. In various embodiments, data quality rules may be created at feed level before file execution. As such, the system can run the data quality rules once the feed is received and identify data anomalies. In various embodiments, the data quality rules may be created, modified, and/or the like via an end-point device. Example types of data quality rules that may be created include simple column validation, cross column validation, feed level validation, and/or the like. As shown in FIG. 12B, the rule type may also be input by the user (e.g., entered manually or selected from a drop-down menu, such as selection menu 1210). The rule type selection may be included in the data quality rule generator page 1200, as shown in FIG. 12C. Additionally, as shown in FIG. 12C, the rule specification may be input by the user (e.g., entered manually or selected from a drop-down menu, such as selection menu 1215). In various embodiments, the system may generate one or more of the rule category, rule type, and/or rule specification, such that a user does not have to input the information (e.g., the system may have a predefined selection that may be changed by the user or a predefined selection that is not changeable by the user).

In various embodiments, a simple column validation may be a data quality rule used to validate the data for one field in a feed. Simple column validation may check for string pattern, date pattern, custom SQL, required field values, minimum/maximum value, unique values, and/or the like.

In various embodiments, a cross column validation may be a data quality rule used to validate the data for a combination of fields in a feed. Each row of a data set may be validated based on the data quality rules for combination of fields. For example, one can check if there are duplicates based on combination of col1, col2 and col3. Cross column validation may check for unique values, custom SQL, and/or the like.

In various embodiments, a feed level validation may be a data quality rule used to validate data at feed level. For feed level validation, a single result output may be generated for the entire feed. For example, the system may check if the total number of records in a feed is within 5 percent of 1 million. In various embodiments, the system may be able to filter the data set to perform feed level validation. For example, the system may check the threshold limits for absolute value or based on last output. Feed level validation may check for total number of records, sum of data sets, average of data sets, custom SQL, and/or the like.

Figure 13:
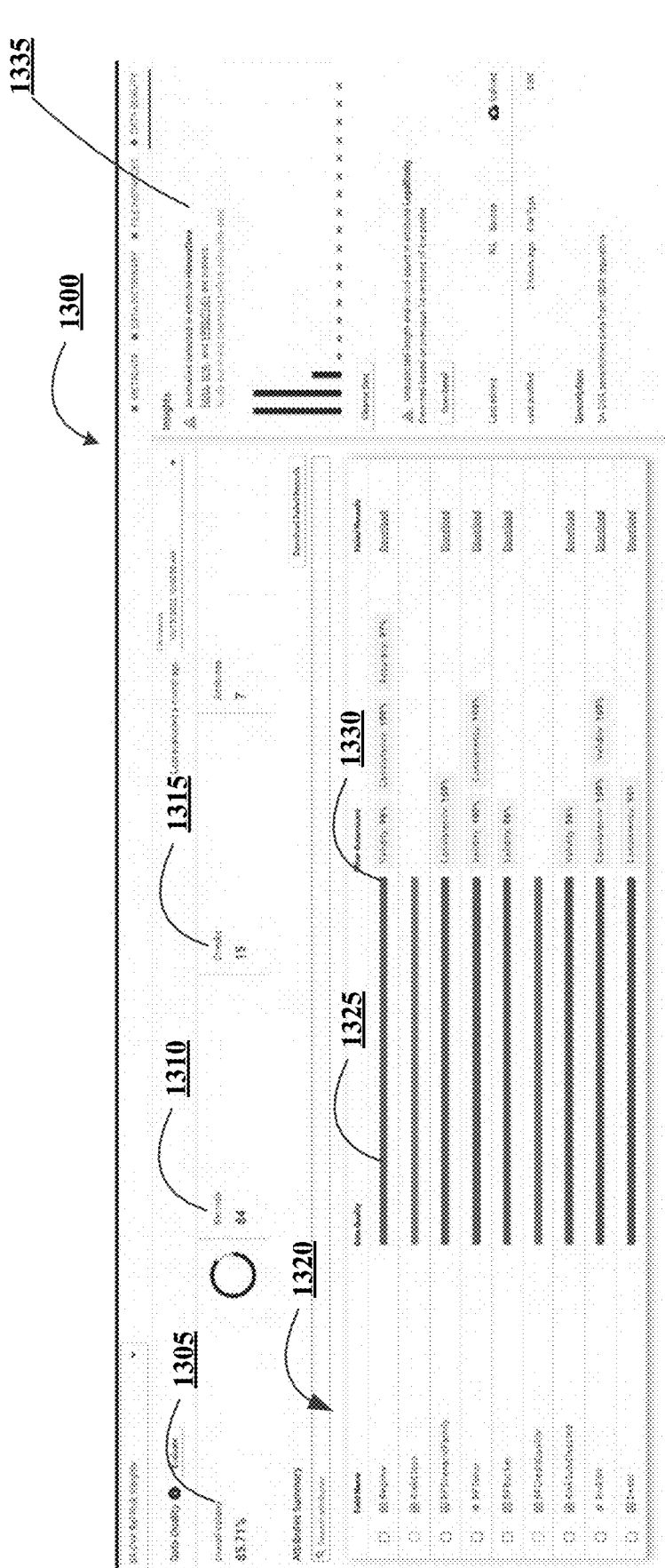
FIG. 13 illustrates an example data rule dashboard, in accordance with various embodiments of the present disclosure.

Referring now to FIG. 13, the system may cause a rendering of a user interface with results of the data quality rule monitoring. For example, the flow designer interface may include a data quality dashboard 1300 that includes the results of one or more data quality rule results. For example, the data quality dashboard may include which data quality rules passed on a data set and information relating to the data set, such as the percentage of the data set that passed the data quality rules.

The data quality dashboard, such as the data quality dashboard 1300 shown in FIG. 13, provides an overall picture about the quality of data at the feed level for each feed. In the dashboard, a user associated with an end-point device can see various measures, such as type of data quality rule (e.g., Validity, Consistency, Accuracy, Integrity, Completeness, Timeliness), percentage of good records for each field, and/or the like. Railed records may also be downloadable in order to do further analysis. For example, the data quality dashboard 1300 may include the overall validity of the data 1305, the number of records scanned 1310, the number of data quality rules checked 1315, the individual data quality for each data set (e.g., via the attribute summary section 1320. For example, for the data file named "Regime", the data quality is mostly good quality (e.g., represented by bar 1325) with only a small subset that is considered bad (e.g., represented by bar 1330). In various embodiments, the data quality dashboard 1300 may also include an insights section 1335 that includes anomalies detected in the data sets.

Once the feed level data quality rules are executed, the data quality dashboard may provide the overall quality of data. The system may make decisions before the data is consumed. Additionally or alternatively, a user may make decisions relating to the data. In an instance in which the data is determined to not be good enough, then actions may be executed, either automatically or manually, such as reaching out to the corresponding source team. As such, delays in file delivery of a feed may be identified. In an instance in which the data quality rule output executed at flow level data has predetermined number of bad records, the source data may be reviewed, and appropriate actions may be taken (e.g., updating the source data). As such, the data quality dashboard provides a powerful adjustment management feature that is easy to visualize, understand, design, and debug.

Data quality rules may be generated for each plugin within a flow. As such, the data quality rules may be created for the feed level and/or the flow level. As such, the data quality rules may be executed on individual feeds or across the entire flow.

In various embodiments, data quality rules allow the system to identify potential data issues by various predefined rules. As such, the system may detect potential weak points in processes and generate recommendations for action. Based on the DQ rule output, the system may determine that the data needs undergo cleansing and enrichment. For example, duplicates in the data may be removed, data for missing elements may be added, and/or the like.

In various embodiments, the system may include a scheduler that allows for workflow(s) to be scheduled for execution. The scheduler allows for execution to be scheduled at a pre-determined time or when a data feed/file is ready to be consumed or triggered from an upstream system. As such, the scheduler may have triggers to execute different flows.

In various embodiments, triggers for flow execution may include time-based triggers, file-based triggers, and/or manual-based triggers. In time-based triggers, the same business workflows can be made to execute under different times with different input parameters that are required for the workflows using the over-ride functionality in the scheduler. In file-based triggers, flows are executed upon arrival of at least one data file from upstream and can also be set on multiple files. In manual-based triggers, the flows are executed based on the pre-set configurations and are triggered by the user. The user can modify the input parameters before execution. This trigger also allows the user to execute a flow for days in the past.

Figure 14A:
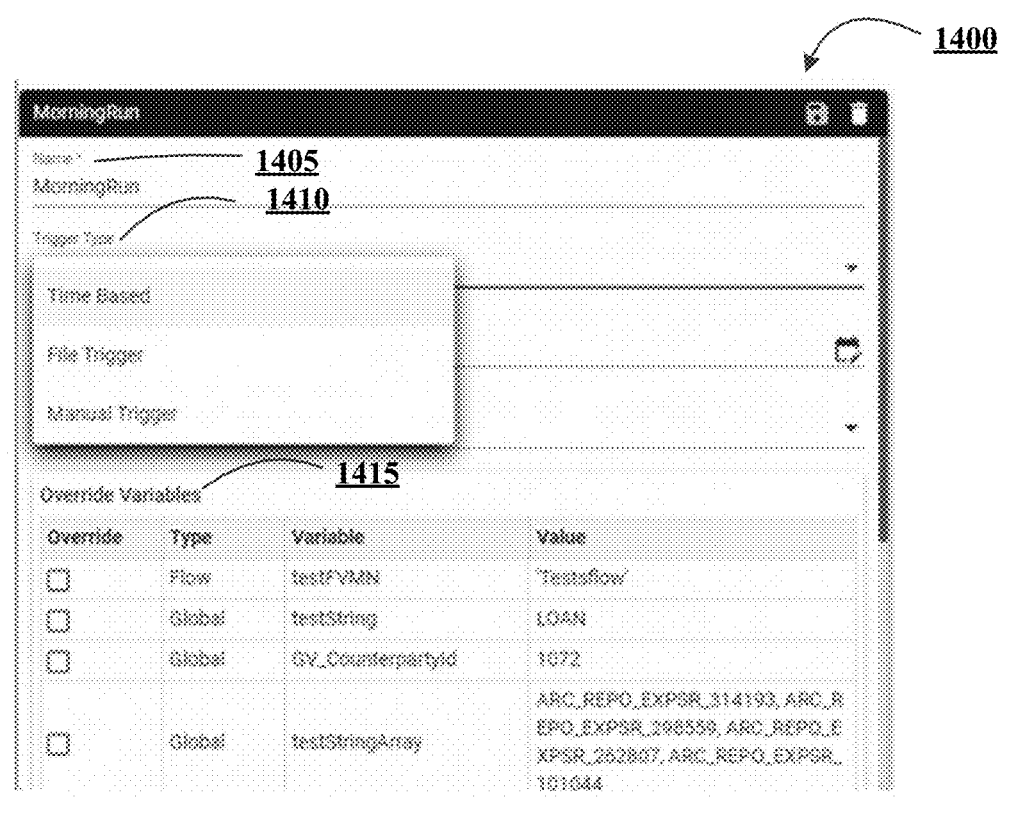
FIGS. 14A-14D illustrate various user interfaces used to schedule flow executions, in accordance with various embodiments of the present disclosure.
Figure 14B:
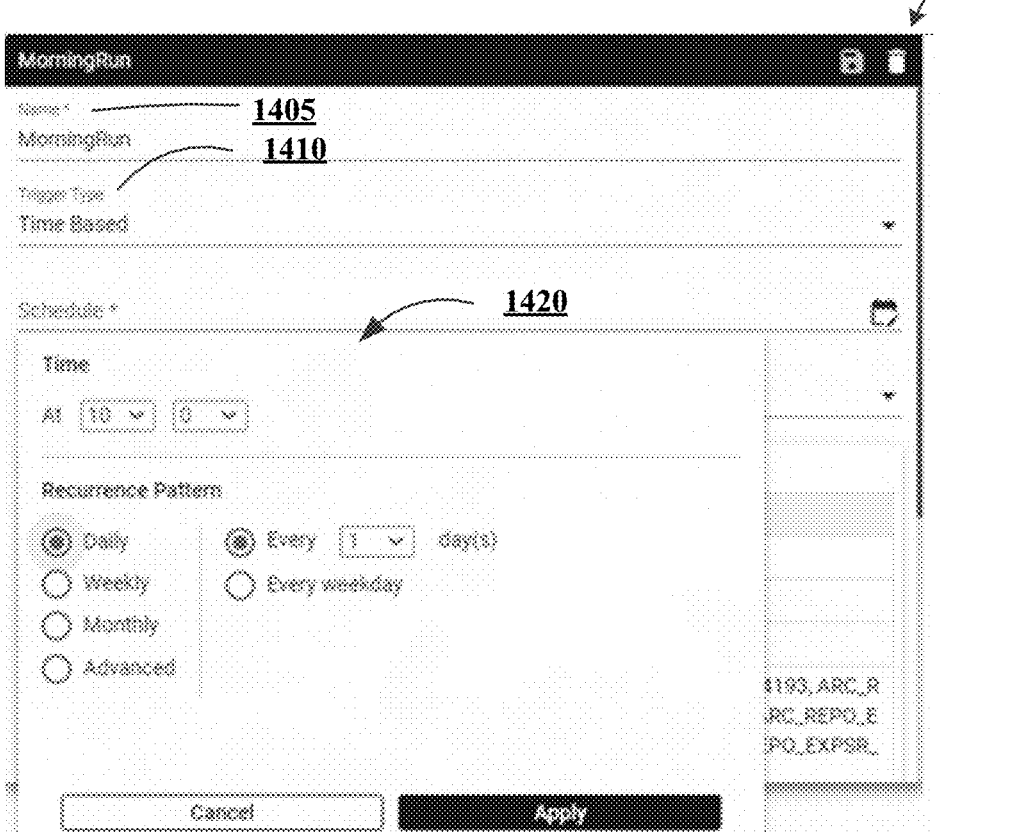
Figures 14C, 14D:
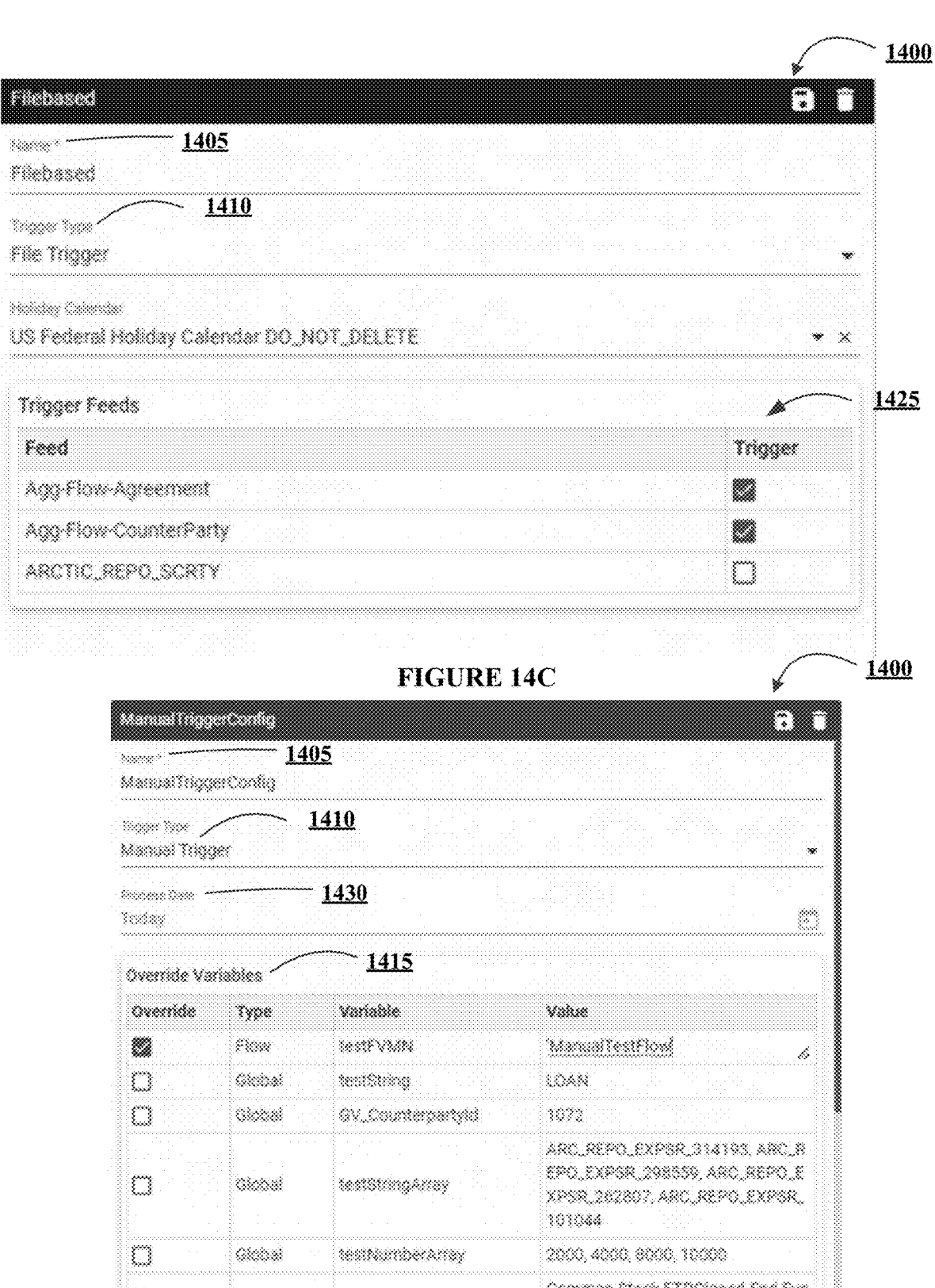

Referring now to FIGS. 14A-14D, creation of a scheduled execution in the scheduler via a graphical user interface. As shown, in FIG. 14A, a flow execution scheduler interface 1400 may include an execution name 1405 and a trigger type 1410 (e.g., time-based, file trigger, manual trigger, etc.). The flow execution scheduler interface 1400 may also include a variable override portion 1415 in which one or more variables can be overridden (e.g., deactivated in an instance the variable being created is used). The graphical user interface may also request additional information relating to the trigger (e.g., FIG. 14B). For example, a time-based trigger may include the time of trigger and information relating to recurring execution as shown by selection 1420 (e.g., the execution may be repeated daily, weekly, monthly, etc.). FIGS. 14C and 14D illustrate different trigger types (e.g., file trigger in FIG. 14C and manual trigger in FIG. 14D). For the file trigger type shown in FIG. 14C, the flow execution scheduler interface 1400 may include a trigger selection portion 1425, in which the different triggers may be defined and/or selected. As shown, some triggers may be selected and/or deselected for a given variable. For a manual trigger, such as the one shown in FIG. 14D, the flow execution scheduler interface 1400 may include the process time 1430, which indicates the time at which the flow is to be triggered. The manual trigger and file triggers may also include the ability to override variables.

After initial configuration of a flow execution is provided, the flow execution may be automated without any additional information. For example, the time-based and file-based schedulers may be automatically executed upon being triggered. The system may be capable of running the same flow executions on multiple schedules with different input parameters through the over-ride functionality within the system.

In various embodiments, a flow is a collection of steps and rules used to automate a data process. In various embodiments, the data flow may be generated by a user via the flow designer discussed herein. For example, a typical flow may consist of determining data sources, data transformation, data writing and data reporting steps. The scheduler discussed herein allows workflows to be automated without the need of manual intervention after the initial configurations are completed. The workflows can be executed using the scheduler at a predetermined time (e.g., daily at 10:00 AM), based on the arrival of any upstream data files or from a database call, and/or manually by a user.

Figure 15:
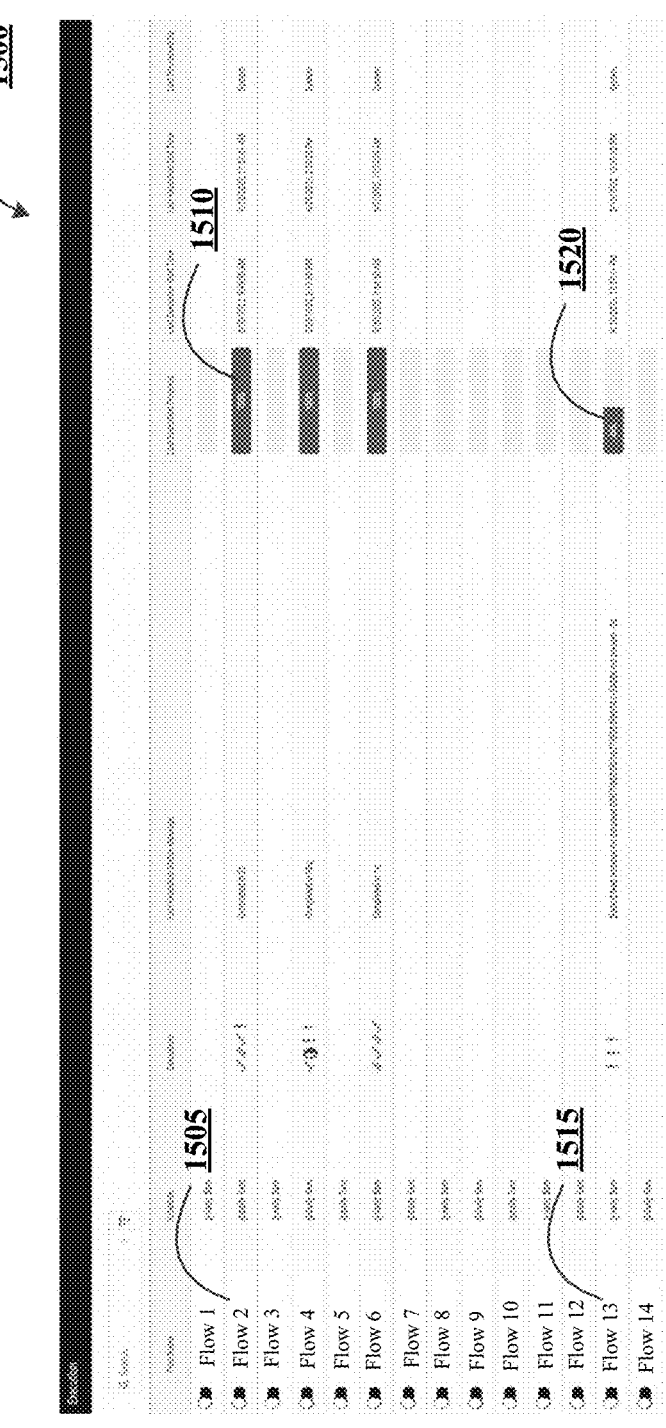
FIG. 15 illustrates an example execution dashboard, in accordance with various embodiments of the present disclosure.

In various embodiments, the system may cause rendering of an execution dashboard that provides transparency of end-to-end flow execution along with rules, calculations, custom plug-ins, the ability to draw lineage for each data operation, and/or the like. FIG. 15 shows an example execution dashboard 1500. The execution dashboard allows a user to quickly view the status of workflow execution and start utilizing processed data for downstream reporting. The execution dashboard may include a variety of statistics such as time taken, data quality issues, data lineage, status of overall process, and/or the like. Details of each execution also gives lineage details for each data point, row or column of data.

As shown in FIG. 15, the execution dashboard 1500 may include a list of one or more flows (e.g., each row of the chart shown in FIG. 15 is a flow) with each flow including information relating to scheduled execution, previous executions, last execution status message, progress of last execution, last execution start time, last execution end time, cause of last execution, and/or the like. For example, for the flow named "Counterparty flow_RM_4" 1505, execution is scheduled daily at 5 AM. The last four executions have included three successful executions (indicated by the double check mark) and one unsuccessful executions (indicated by the Exclamation point). The last execution was completed in 2 second and was 100% completed (as indicated by the progress bar 1510). Meanwhile, the last execution of Flow 13 1515 failed at 44% completion.

Referring now to FIGS. 16A-16D, the system may include data tracing that can be used within the flow designer interface. The data tracing feature allows users to trace any individual data row or individual data column in both directions through a flow (e.g., from input to output tracing and/or from output to input tracing). As such, the system allows network users to easily understand how each individual data point is sourced, how the data point has been derived and transformed at each step of the flow through a visual representation. Data tracing allows for the individual rows, columns, and/or cells to be traced for each plugin. As such, the system provides a visual representation of the input and output data sets for each plugin.

Data tracing allows users to review data at each step of the process in both directions. Forward tracing from input to output and backward tracing from output to input. The system may include data tracing performed at the column, row, and/or cell level.

Column tracing gives the users the ability to see where in the flow a column is used and allow for the any transformations on the column to be located. For example, in an instance in which a column is traced, the system may highlight all the plugins that use that column on the flow designer interface. In an instance in which a pivot column is traced, the system may highlight the plugins where the original column occurs.

Row tracing allows network users to follow the directions of the data. The row can be traced in the same or multiple workstreams. The system may display various data transformations and enhancement, aggregated fields, inspect filters, joins and various data enrichments, and/or the like. In various embodiments, the system may allow data tracing a row from an aggregation or a pivot plugin. In such an example, the system may highlight all the rows that compile that aggregated row or pivoted row.

Data cell tracing is a combination of row and column tracing. As such, the system traces a data cell, by highlighting all the plugins in the workflow where that given row and column of the data cell appears. Users may then be able to click on each highlighted plugin and view the data.

During data tracing, the system may enter inspection mode in which data manipulation is deactivated, such that the data may be traced without any unwanted changes to the data sets. At each step of data tracing, the system may allow the data to be exported (e.g., to local folders in a .csv file format).

In various embodiments, data tracing may be carried out on a flow that has previously been executed successfully. Execution dashboard (e.g., execution dashboard 1500 shown in FIG. 15) allows a user to quickly view the status of workflow execution and start utilizing processed data for downstream reporting.

Figure 16A:
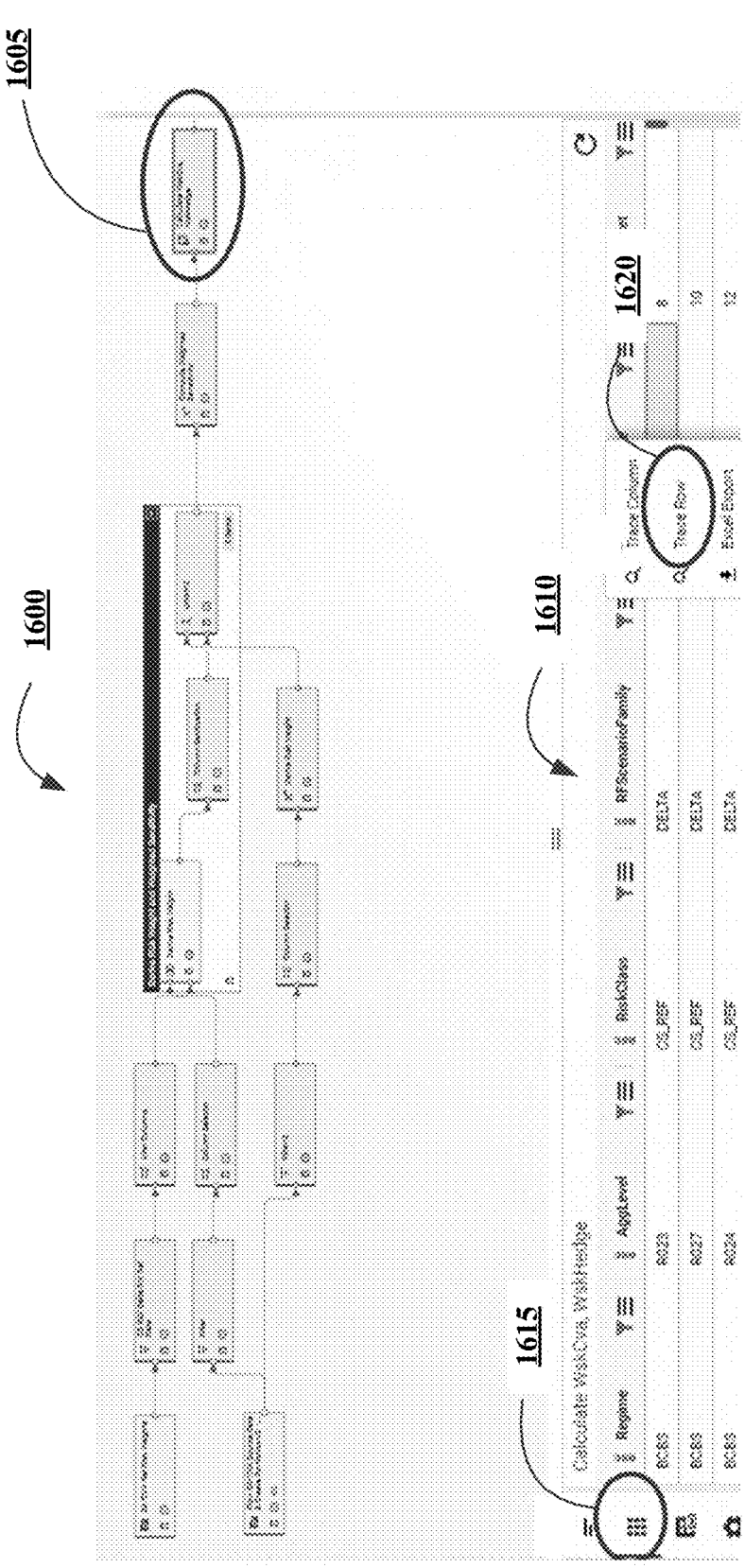
FIGS. 16A-16D illustrate various flow designer interfaces that include data tracing functionality, in accordance with various embodiments of the present disclosure.
Figure 16B:
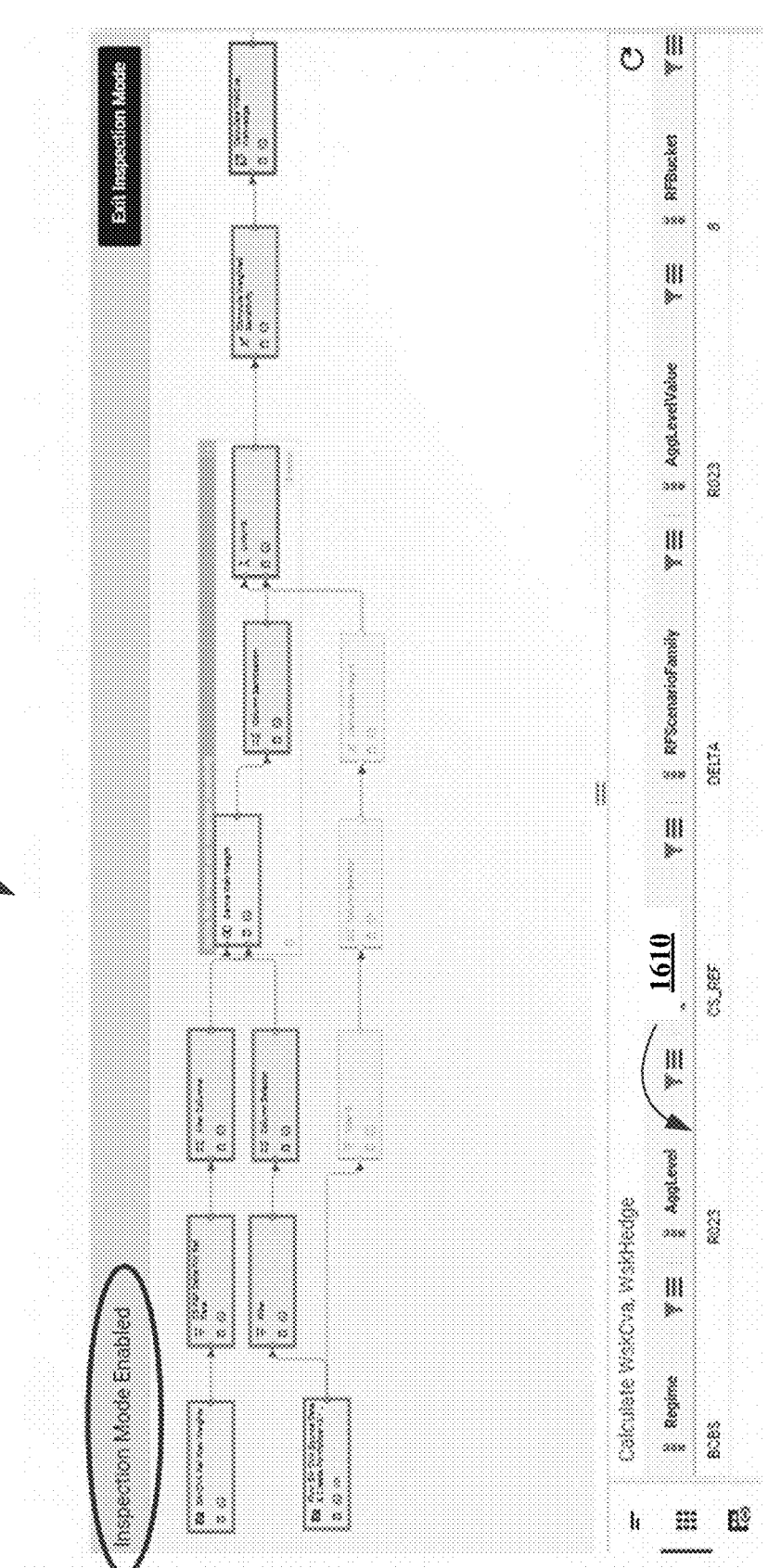
Figure 16C:
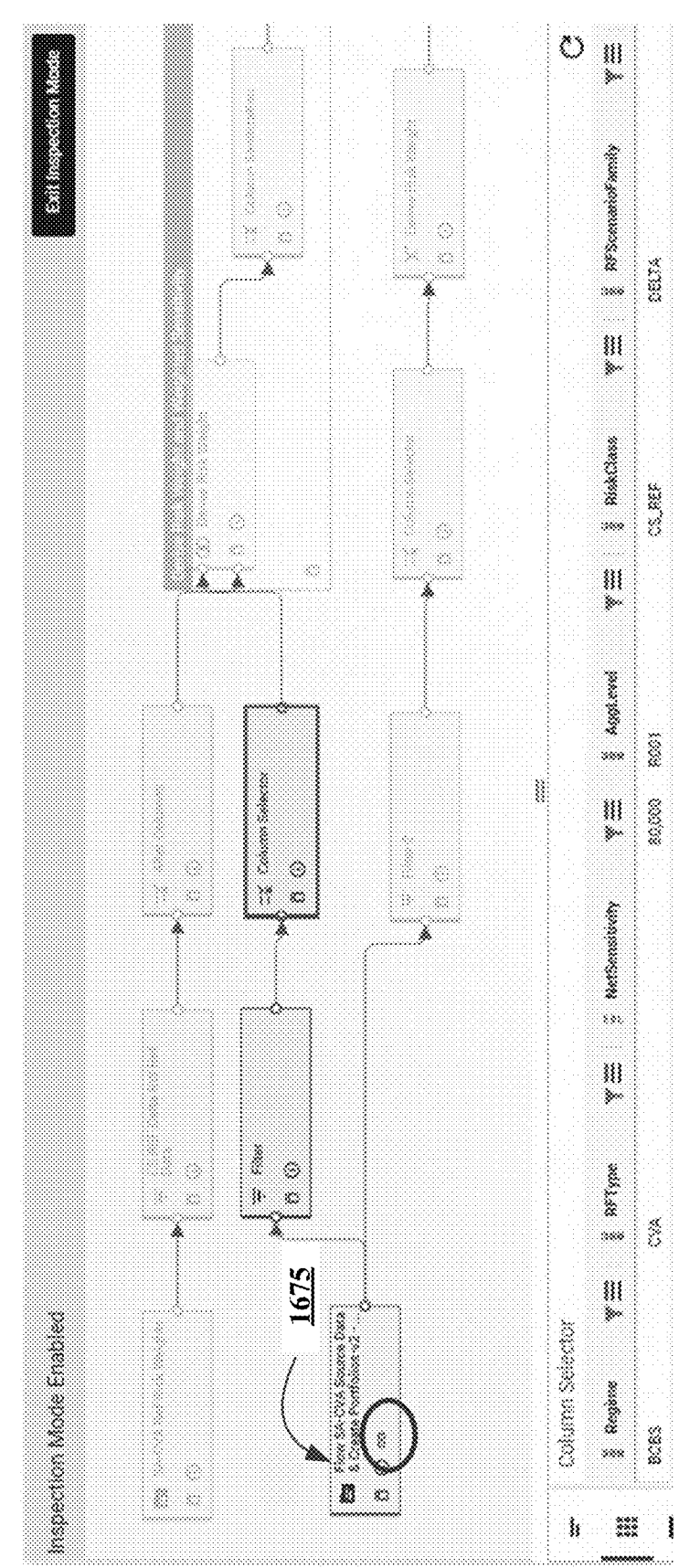
Figure 16D:
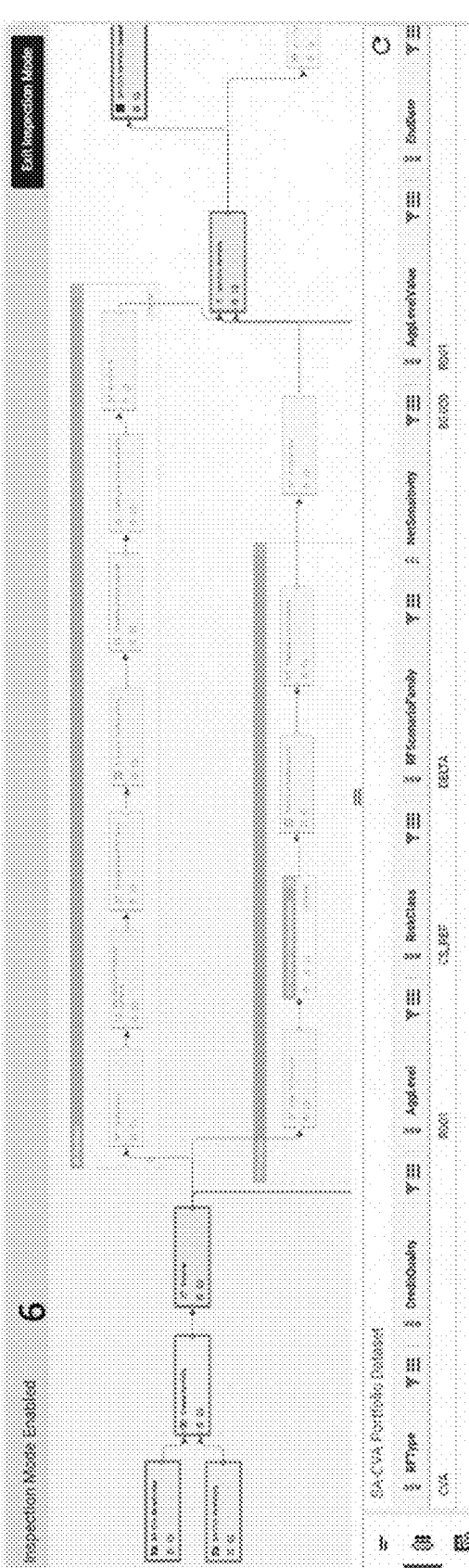

Referring now to FIG. 16A, data from any plugins in a flow may be data traced. As shown, plugin 1605 is selected and the data set is shown in the data portion 1610 of the flow designer interface 1600 (via selecting icon 1615). As shown, a network user may select the type of data tracing (e.g., here, the user selects Trace Row 1620). FIG. 16B illustrates an example flow designer interface 1600 in which inspection mode has been activated. As discussed above, inspection mode prevents the data from being manipulated, but allows user to use the data tracing feature. As shown, the row 1650 is being data traced. Each of the plugins that are part of transforming the data in the row are shown as highlighted blocks, while the other plugins are greyed out. As shown in FIG. 16C, the row originated from an upstream flow (e.g., another flow in which the plugin 1675 is represented. As such, the system may allow the data tracing to continue to the previous flow (e.g., FIG. 16D illustrates the flow represented by plugin 1675 in FIG. 16C).

In various embodiments, the system may define variables to be used during flow execution. Examples of variables defined on the system include global variables, flow variables, and system variables. Global and flow variables may be defined by system users. System variables may be a set of predefined read-only dynamic variables (e.g., system date, user id, etc.) available to all the applications onboarded on the network. Global variables are available to all the flows, while the flow variables are available only in the flow it is defined and any child flows.

Global and/or flow variables allow for flows to be re-purposed and/or re-used using different variable. For example, the same flow can be used with different global variables in order to produce two different, but desired data outputs. For example, some flows may use the same data feeds but operate on only a subset of the data for each flow and variables allow a single flow to be used instead of multiple flows. Global and/or flow variables may be defined as static or dynamic. In an instance in which a variable is static, a user may provide the values of the variable that remain constant during execution of the flows. In an instance in which a variable is dynamic, a system may receive a configuration from a user for the variable, and the system may then determine the values to be used as the variable during run time on the day of execution. Dynamic type variables may be generated using various generators such as a date generator, a sequence generator, a SQL generator, and/or the like.

Figure 17:
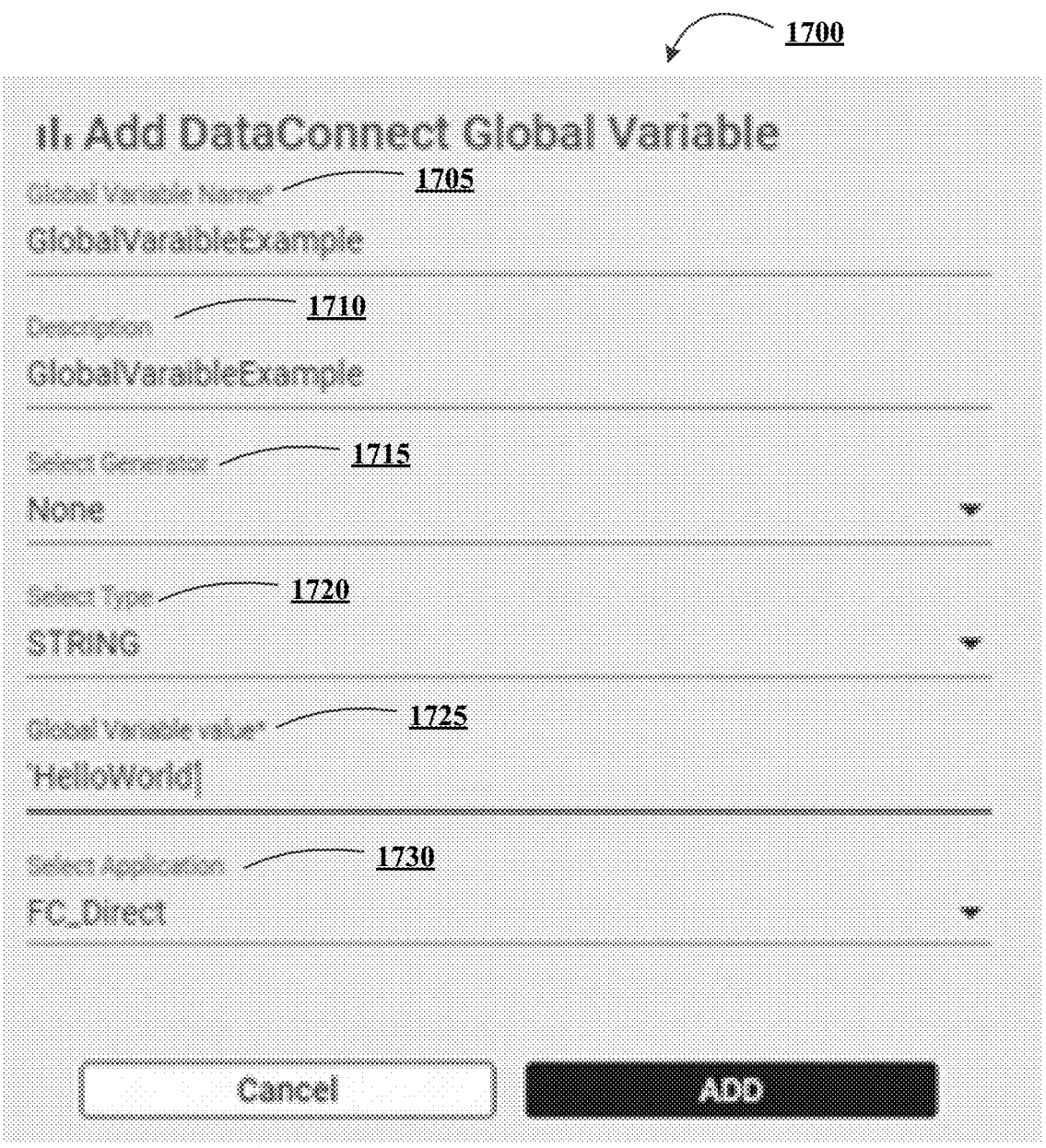
FIG. 17 illustrates a global variable generation interface for defining a global variable, in accordance with various embodiments of the present disclosure.

Referring now to FIG. 17, a global variable generation interface 1700 for defining a global variable in the system is shown. The global variable generation interface 1700 may be part of the flow designer interface discussed herein. As shown, the interface may allow various different components of the global variable to be defined. While FIG. 17 illustrates a global variation generation, the same operations may be used for flow variables with the flow variables only applying to a specific flow.

In various embodiments, the global variable generation interface 1700 may input selection for the global variable name 1705, global variable description 1710, select generator 1715, select data type 1720, global variable value 1725, select application 1730, and/or the like. Example select generator 1715 options include date generator, sequence generator, SQL generator, and/or the like. The select generator may be indicated as none in an instance in which the variable is static. Example select data type include string, integer, decimal, Boolean, date, timestamp, string array, number array, and/or the like. In various embodiments, the variables allow for the flows to be adapted and/or changed for different conditions without changing any of the actual operations of the flow.

Figure 18:
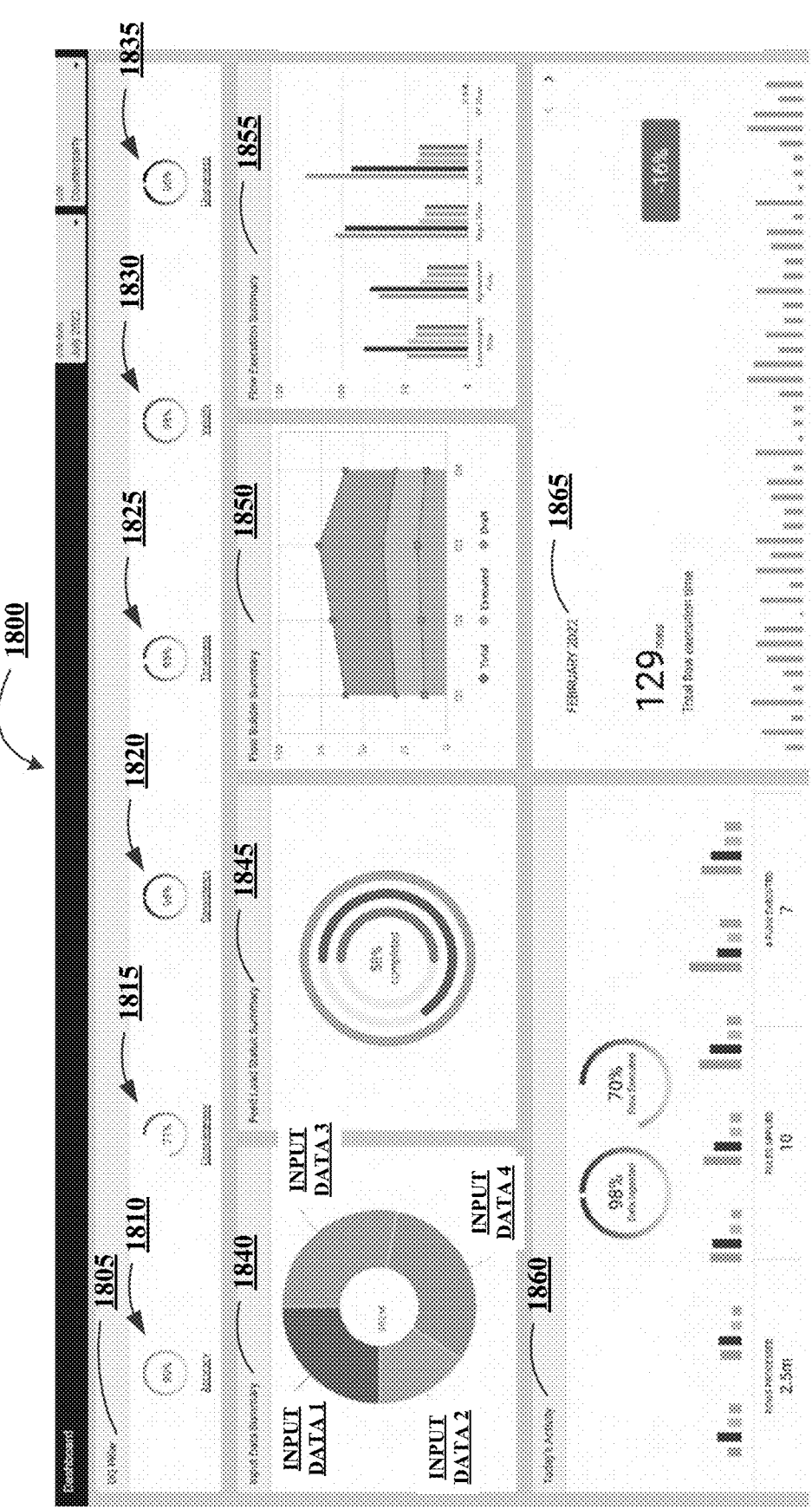
FIG. 18 illustrates an example analytics dashboard, in accordance with various embodiments of the present disclosure.

In various embodiments, the system may generate analytics and reports based on the flow executions discussed herein. An example data quality dashboard is shown in FIG. 13 and discussed above. An example analytics dashboard is shown in FIG. 18. The analytics dashboard 1800 may include analytics (e.g., statistics relating to the flow executions), reports generated relating to the flow executions, and/or what-if scenarios (e.g., simulated flow executions). As such, the system may provide access to real-time or near real-time information via the analytics dashboard 1800. In various embodiments, the system may create end user reports and analytics to be displayed on the analytics dashboard 1800.

As shown in FIG. 18, the analytics dashboard 1800 may include various different dashboard components, such as data quality component 1805, an input data summary 1840, a feed load status summary 1845, a flow builder summary 1850, a flow execution summary 1855, and summary of analytics for time periods (e.g., today's activity 1860 and/or month's activity 1865).

The data quality component 1805 may include an accuracy indicator 1810, a completeness indicator 1815, a consistency indicator 1820, a timeliness indicator 1825, a validity indicator 1830, a uniqueness indicator 1835, and/or the like. Each of the indicators on the data quality component 1805 may relate to one or more data sets in one or more flows. As such, the percentage shown in each indicator may correspond to all of the data sets in the one or more flows.

The input data summary 1840 may include a chart of the percentages of different input data sets. As shown, the input data in the example has four different input data (e.g., input data 1, input data 2, input data 3, and input data 4). The feed load status summary 1845 may include information relating to the amount of the data received from the input sources. For example, as shown, 58% of the total input data may be received by the system.

The flow builder summary 1850 may include the total flows built, the flows that were executed, and the flows that are created, but not yet executed (e.g., draft flows). The flow builder summary 1850 may include a chart relating to the data. The flow execution summary 1855 may also include visual representations of the flow executions.

In various embodiments, analytics based on time periods may be displayed on the execution dashboard 1800. For example, today's activity 1860 may include various different statistics relating to the flow executions for a given day. Additional time periods may also have a dashboard component. For example, the month's activity may also include information relating to the flow executions for the given month.

FIGS. 19A and 19B include a flow chart 1900 that illustrates an example method of determining data feed sources for interactive automated code generation and modification. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. A method of various embodiments may include any combination or subset of the features discussed herein.

Various operations of the system are detailed in reference to FIGS. 3-18. Each of the operations may be included in the method discussed in reference to FIGS. 19A and 19B. Various embodiments of the present disclosure provide a web-based no-code visual development platform via a flow designer interface that allows complex data compilation, manipulating, and/or the like without requiring complex coding skills. Various embodiments of the platform include data ingestion, data quality checks, data rules, flow creation and modification, flow execution scheduling, calculation integration, and/or various other features into an interactive environment (e.g., a flow designer interface) that provides an end-to-end solution from determining data sources to reporting and analytics. The system also supports data enrichment, data transformation, process automation, and/or the like.

Referring now to Block 1902 of FIG. 19A, the method includes causing a connection with one or more data feeds. Each of the one or more data feeds are capable of providing at least one data set for a flow execution. The data feed(s) may be connected to the network(s) 110 that the system is connected (e.g., the system may communicate with the data feed(s) via network(s) 110). The data feed(s) may be connected to the system in various ways, such as a manual connection (e.g., a user may cause a connection), automatic (e.g., a system may connect to any potential data feeds that are available on the network(s) 110), and/or partially automatic (e.g., a list of available data feeds may be available for a network user to select data feed(s) to connect (e.g., some data feeds may not include any relevant data for any flows that would be executed and as such, may not be displayed as a data feed available to be selected as a selected data feed).

Each of the data feeds may include one or more data sets to be processed in a flow as discussed herein. The data feed may be a database and/or pipeline in which data is output to be provided to the system (e.g., an output of a flow may be available as a data feed for other flows). Any potential source of data may be considered a data feed for the purposes of the method discussed herein.

Referring now to Block 1904 of FIG. 19A, the method includes determining a recommendation of at least one of the one or more data feeds to be used for the flow execution based on one or more plugins selected for a flow. The recommendation of at least one of the one or more data feeds to be used for the flow execution based on one or more plugins selected for a flow may be made using the AI/ML model(s) discussed herein. As discussed above, the AI/ML model(s) may be trained using historical data. In various embodiments, the recommendation may be based on similarities between the current flow and a previous flow. For example, a flow with specific plugins may often also have the same type and/or specific data feed(s) to provide data for the plugin. As such, the system may determine the recommendation based on one or more plugins selected for a flow (e.g., plugins represented in the flow portion of the flow designer interface).

In various embodiments, the recommendation of at least one of the one or more data feeds to be used for the flow execution based on one or more plugins selected for a flow may be made based on the data feeds available. For example, certain data feeds may be used in flows more than other data feeds, and the recommendation may include commonly used data feeds. In various embodiments, the commonly used data feeds may be based on the type of user (e.g., a specific user may use certain data feeds more often and/or similar situated network users, such as network users with the same job title, may use certain data feeds more often). As such, the recommendation may be based on information relating to the network user designing the flow.

Referring now to Block 1906 of FIG. 19A, the method includes causing a transmission of the recommendation of at least one of the one or more data feeds to be used for the flow execution. The recommendation may be caused to be rendered to the flow designer interface of the end-point device associated with a network user. For example, a pop-up message may be provided that indicates recommended data feed(s). As such, a network user may select one or more of the recommended data feed(s) to be designated as a selected data feed.

In various embodiments, the recommendation of at least one of the one or more data feeds to be used for the flow execution may be provided along with the list of the one or more data feeds in which each of the data feeds may be selected as one of the one or more selected data feeds discussed below in reference to Block 1908. For example, the recommended data feed(s) may be listed above other data feeds and/or designated differently than the other data feeds (e.g., the recommended data feeds may be highlighted or otherwise indicated as a recommended data feed).

Referring now to Block 1908 of FIG. 19A, the method includes causing a rendering of each of the one or more data feeds to an end-point device. The rendering may be to an end-point device associated with a network user. In various embodiments, the rendering may be part of the flow designer interface, as either an additional page and/or a portion of the flow designer interface (e.g., beside the flow portion, plugin portion, etc.).

In various embodiments, the rendering of each of the one or more data feeds to the end-point device may be a list of the one or more data feeds in which each of the data feeds may be selected as one of the one or more selected data feeds. The list may include information relating to each of the data feed(s), such as the source of the data feed, the type of data available from the data feed, description of the data feed, the date of last update for the data feed, and/or the like. In various embodiments, each of the data feeds may be selectable (e.g., a check box that can be checked or unchecked to indicate the data feeds that are designated as selected data feeds). As such, the list of the one or more data feeds may be used to designate the selected data feeds as detailed in reference to Block 1910.

Referring now to Block 1910 of FIG. 19A, the method includes receiving an indication of one or more selected data feeds from the one or more data feeds. The one or more selected data feeds provide at least one data set for the flow execution. In various embodiments, the indication of one or more selected data feeds may be via an end-point device of a network user. For example, the network user may designate the selected data feeds from a list of data feeds. The indication of the one or more selected data feeds may take various forms, such as manually entry, selection from a list, selection of one or more plugin icons that correspond to given data feeds in the plugin portion of the flow designer interface, and/or the like.

Referring now to Block 1912 of FIG. 19A, the method includes determining an additional selected data feed from a new data feed input from the end-point device. In various embodiments, additional data feeds may be manually connected and/or identified by a network user. For example, as shown in FIGS. 4 and 5, the platform provides a feed builder in which a network user can identify a new data feed that may be used in one or more flows. As shown. The network user may select the data source and designate information relating to the data source. As such, the operations shown in FIGS. 4 and 5 may be used as the new data feed input. As such, the additional selected data feed may be different than the other data feeds already available for selection by the system. In various embodiments, after data feed creation, the data feed may be included in data feeds available to be selected in other flows (e.g., to be available for designation as a selected data feed in future operations).

Referring now to optional Block 1914 of FIG. 19A, the method includes causing a rendering of the additional selected data feed to the end-point device based on the new data feed input. The rendering may be a part of the list of data feeds discussed above. Alternatively, the additional selected data feed may be included with other selected data feeds. In various embodiments, plugins may be generated for each of the selected data feeds (e.g., to be rendered on the plugin portion of the flow designer interface). As such, the selected data feed may be selectable as a plugin to be rendered to the flow portion of the flow designer interface.

Referring now to optional Block 1916 of FIG. 19B, the method includes receiving an existing feed modification from the end-point device. One or more of the data feeds may be customizable by a network user. As such, a user may select a data feed and make modifications. In various embodiments, the existing feed modification may be a change to one of the one or more data feeds. Existing feed modification may be completed in the same way in which the data feeds may be generated, as shown in FIGS. 4 and 5. For example, a network user may select a given data feed and change information relating to the data feed (e.g., just as the network user may select the information as shown in FIGS. 4 and 5).

Referring now to optional Block 1918 of FIG. 19B, the method includes causing a modification to one of the one or more data feeds based on the existing feed modification. Based on the existing feed modification received, the system may update the given data feed. The modification to the data feed may be only for certain flows (e.g., local change for a given flow) or globally (e.g., for any flows in which the data feed is available). Various different types of modification may be included, such as the amount of data received via the data feed, specific data sets provided by the data feeds, one or more key event indications for the data feeds, and/or the like.

Referring now to optional Block 1920 of FIG. 19B, the method includes causing each of the one or more selected data feeds to be rendered in a plugin portion of a flow designer interface. As discussed above in reference to FIGS. 3A and 3B, the plugin portion may include various plugin icons that correspond to the data feeds. As such, the selected data feeds may be selected and placed in the flow portion of the flow designer interface. In various embodiments, the selected data feeds may be connected to one or more plugins that include transformations and/or other modifications to data. As such, the system may transmit data from a data feed to one or more plugins to be modified and/or altered.

Referring now to optional Block 1922 of FIG. 19B, the method includes causing at least one of the one or more selected data feeds to be used as an input data feed for at least one plugin in a flow portion of the flow designer interface. As discussed above in reference to Block 1920, the data feeds may be placed in a flow and used as an input data feed for the plugins therein. As such, the flow may be generated using the selected data feeds as input data feeds.

Referring now to Block 1924 of FIG. 19B, the method includes causing an execution of the flow with each of the selected data feeds and the additional selected data feed included. As discussed herein, the flow may be generated using the selected data feeds and the additional selected data feed. The flow may be generated and/or executed in any of the ways discussed herein. For example, the each of the selected data feeds and the additional selected data feed may be rendered on the flow portion with connections to one or more plugins indicating the flow of data during the flow execution.

Referring now to optional Block 1926 of FIG. 19B, the method includes causing one or more data sets to be received from at least one of the one or more selected data feeds in response to receiving a key event indication relating to the at least one of the one or more selected data feeds. The system may monitor for one or more key event indication to occur in order to cause data import to be actuated from the data feed(s) For example, the system may communicate with one or more data sources to determine when the data source has been updated. Each data feed may have one or more different key event indication that indicates that data should be imported from the data feed. For example, a given data feed may have a key event indication that is transmitted in an instance in which the data in the data feed is updated.

As such, the data importing does not have to be continuous, but does not lag real-time. In various embodiments, key event indications may be designated by a user, which allows the system to be customizable. Key event indications may also be designated by the data feed (e.g., a source of a data feed may provide a key event indication). Additional example key event indications may include a date and/or time (e.g., data feed may be updated periodically), execution of a flow (e.g., data feed may be updated at each execution of a flow), and/or the like.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

INCORPORATION BY REFERENCE

To supplement the present disclosure, this application further incorporates entirely by reference the following commonly assigned patent applications:

| Docket Number | U.S. patent application No. | Title | Filed On |
|---|---|---|---|
| 14435US1.014033.4624 | To be assigned | SYSTEM AND METHOD FOR INTERACTIVE AUTOMATED CODE GENERATION AND MODIFICATION FOR DATA PROCESSING | Filed Concurrently Herewith |
| 15180US1.014033.4729 | To be assigned | SYSTEM AND METHOD FOR INTERACTIVE AUTOMATED MODIFICATION OF TRANSFORMED DATA SETS | Filed Concurrently Herewith |
| 15181US1.014033.4732 | To be assigned | SYSTEM AND METHOD FOR DETERMINING AND MAINTAINING DATA QUALITY IN DATA PROCESSING | Filed Concurrently Herewith |

What is claimed is:

1. A system for determining data feed sources for interactive automated code generation and modification, the system comprising:

at least one non-transitory storage device containing instructions; and at least one processing device coupled to the at least one non-transitory storage device, wherein the at least one processing device, upon execution of the instructions, is configured to:

cause a connection automatically with one or more data feeds based on the one or more data feeds available on a network, wherein each of the one or more data feeds are capable of providing at least one data set for a flow execution;

determine, using a trained artificial intelligence model, a recommendation of plugin connections and at least one of the one or more data feeds to be used for the flow execution based on one or more plugins selected for a flow, wherein the recommendation is based on available data feeds associated with a flow designer and comparisons between the flow and a previous flow;

cause a transmission of the recommendation of at least one of the one or more data feeds to be used for the flow execution;

cause a rendering of each of the one or more data feeds to a flow designer interface of an end-point device of a network user, wherein the flow designer interface comprises a pop-up message comprising each of the one or more data feeds, and wherein the rendering comprises a selectable box and last update date for each of the one or more data feeds;

receive, via the end-point device of the network user, an indication of one or more selected data feeds from the one or more data feeds, wherein the one or more selected data feeds provide at least one data set for the flow execution, and wherein the indication comprises a checked selectable box;

determine an additional selected data feed from a new data feed input from the end-point device, wherein the new data feed input indicates additional selected data feed that is different than each of the one or more data feeds; and cause an execution of the flow with each of the selected data feeds and the additional selected data feed included.

2. The system of claim 1, wherein the at least one processing device, upon execution of the instructions, is configured to cause one or more data sets to be received from at least one of the one or more selected data feeds in response to receiving a key event indication relating to the at least one of the one or more selected data feeds.

3. The system of claim 1, wherein the at least one processing device, upon execution of the instructions, is configured to:

receive an existing feed modification from the end-point device, wherein the existing feed modification is a change to one of the one or more data feeds; and cause a modification to one of the one or more data feeds based on the existing feed modification.

4. The system of claim 1, wherein the at least one processing device, upon execution of the instructions, is configured to cause a rendering of the additional selected data feed to the end-point device based on the new data feed input.

5. The system of claim 1, wherein the rendering of each of the one or more data feeds to the end-point device is a list of the one or more data feeds in which each of the data feeds may be selected as one of the one or more selected data feeds.

6. The system of claim 1, wherein the at least one processing device, upon execution of the instructions, is configured to cause each of the one or more selected data feeds to be rendered in a plugin portion of the flow designer interface.

7. The system of claim 6, wherein the at least one processing device, upon execution of the instructions, is configured to cause at least one of the one or more selected data feeds to be used as an input data feed for at least one plugin in a flow portion of the flow designer interface.

8. A computer program product for determining data feed sources for interactive automated code generation and modification, the computer program product comprising at least one non-transitory computer-readable medium having computer-readable program code portions embodied therein, the computer-readable program code portions comprising one or more executable portions configured to:

cause a connection automatically with one or more data feeds based on the one or more data feeds available on a network, wherein each of the one or more data feeds are capable of providing at least one data set for a flow execution;

determine, using a trained artificial intelligence model, a recommendation of plugin connections and at least one of the one or more data feeds to be used for the flow execution based on one or more plugins selected for a flow, wherein the recommendation is based on available data feeds associated with a flow designer and comparisons between the flow and a previous flow;

cause a transmission of the recommendation of at least one of the one or more data feeds to be used for the flow execution;

cause a rendering of each of the one or more data feeds to a flow designer interface of an end-point device of a network user, wherein the flow designer interface comprises a pop-up message comprising each of the one or more data feeds, and wherein the rendering comprises a selectable box and last update date for each of the one or more data feeds;

receive, via the end-point device of the network user, an indication of one or more selected data feeds from the one or more data feeds, wherein the one or more selected data feeds provide at least one data set for the flow execution, and wherein the indication comprises a checked selectable box;

determine an additional selected data feed from a new data feed input from the end-point device, wherein the new data feed input indicates additional selected data feed that is different than each of the one or more data feeds; and cause an execution of the flow with each of the selected data feeds and the additional selected data feed included.

9. The computer program product of claim 8, wherein the computer-readable program code portions comprising one or more executable portions are also configured to cause one or more data sets to be received from at least one of the one or more selected data feeds in response to receiving a key event indication relating to the at least one of the one or more selected data feeds.

10. The computer program product of claim 8, wherein the computer-readable program code portions comprising one or more executable portions are also configured to:

receive an existing feed modification from the end-point device, wherein the existing feed modification is a change to one of the one or more data feeds; and cause a modification to one of the one or more data feeds based on the existing feed modification.

11. The computer program product of claim 8, wherein the computer-readable program code portions comprising one or more executable portions are also configured to cause a rendering of the additional selected data feed to the end-point device based on new data feed input.

12. The computer program product of claim 8, wherein the rendering of each of the one or more data feeds to the end-point device is a list of the one or more data feeds in which each of the data feeds may be selected as one of the one or more selected data feeds.

13. The computer program product of claim 8, wherein the computer-readable program code portions comprising one or more executable portions are also configured to cause each of the one or more selected data feeds to be rendered in a plugin portion of the flow designer interface.

14. The computer program product of claim 13, wherein the computer-readable program code portions comprising one or more executable portions are also configured to cause at least one of the one or more selected data feeds to be used as an input data feed for at least one plugin in a flow portion of the flow designer interface.

15. A method for determining data feed sources for interactive automated code generation and modification, the method comprising:

causing a connection automatically with one or more data feeds based on the one or more data feeds available on a network, wherein each of the one or more data feeds are capable of providing at least one data set for a flow execution;

determining, using a trained artificial intelligence model, a recommendation of plugin connections and at least one of the one or more data feeds to be used for the flow execution based on one or more plugins selected for a flow, wherein the recommendation is based on available data feeds associated with a flow designer and comparisons between the flow and a previous flow;

causing a transmission of the recommendation of at least one of the one or more data feeds to be used for the flow execution;

causing a rendering of each of the one or more data feeds to a flow designer interface of an end-point device of a network user, wherein the flow designer interface comprises a pop-up message comprising each of the one or more data feeds, and wherein the rendering comprises a selectable box and last update date for each of the one or more data feeds;

receiving, via the end-point device of the network user, an indication of one or more selected data feeds from the one or more data feeds, wherein the one or more selected data feeds provide at least one data set for the flow execution, and wherein the indication comprises a checked selectable box;

determining an additional selected data feed from a new data feed input from the end-point device, wherein the new data feed input indicates additional selected data feed that is different than each of the one or more data feeds; and causing an execution of the flow with each of the selected data feeds and the additional selected data feed included.

16. The method of claim 15, further comprising causing one or more data sets to be received from at least one of the one or more selected data feeds in response to receiving a key event indication relating to the at least one of the one or more selected data feeds.

17. The method of claim 15, further comprising:

receiving an existing feed modification from the end-point device, wherein the existing feed modification is a change to one of the one or more data feeds; and causing a modification to one of the one or more data feeds based on the existing feed modification.

18. The method of claim 15, further comprising causing a rendering of the additional selected data feed to the end-point device based on new data feed input.

19. The method of claim 15, further comprising causing each of the one or more selected data feeds to be rendered in a plugin portion of the flow designer interface.

20. The method of claim 19, further comprising causing at least one of the one or more selected data feeds to be used as an input data feed for at least one plugin in a flow portion of the flow designer interface.

\* \* \* \* \*